United States Patent
Biddle et al.

(10) Patent No.: US 10,175,978 B2
(45) Date of Patent: Jan. 8, 2019

(54) MONITORING CODE SENSITIVITY TO CAUSE SOFTWARE BUILD BREAKS DURING SOFTWARE PROJECT DEVELOPMENT

(71) Applicant: INTERNATIONAL BUSINESS MACHINES CORPORATION, Armonk, NY (US)

(72) Inventors: Luke Biddle, Queensland (AU); Russell A. Currey, Act (AU); Sam Lewis, Queensland (AU); Jared R. Page, Queensland (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/344,034

(22) Filed: Nov. 4, 2016

(65) Prior Publication Data
US 2018/0129497 A1  May 10, 2018

(51) Int. Cl.
G06F 9/44 (2018.01)
G06F 8/71 (2018.01)
G06F 11/36 (2006.01)

(52) U.S. Cl.
CPC ............ *G06F 8/71* (2013.01); *G06F 11/3636* (2013.01); *G06F 11/3668* (2013.01)

(58) Field of Classification Search
CPC .... G06F 11/3668; G06F 8/71; G06F 11/3466; G06F 9/44589
USPC ......................................... 717/101, 126, 127
See application file for complete search history.

(56) References Cited

U.S. PATENT DOCUMENTS

| 8,522,207 B1* | 8/2013 | Whittington ............ G06F 8/433 707/999.203 |
| 9,542,176 B2 | 1/2017 | Bird et al. |
| 2011/0013203 A1* | 1/2011 | Grosz ................. G06F 17/3028 358/1.2 |
| 2014/0053135 A1* | 2/2014 | Bird ...................... G06F 11/008 717/124 |

(Continued)

OTHER PUBLICATIONS

"List of IBM Patents or Patent Applications Treated as Related", dated Nov. 4, 2016, 2 pages.

(Continued)

*Primary Examiner* — Phillip H Nguyen
(74) *Attorney, Agent, or Firm* — Jeffrey S. LaBaw; Amy J. Pattillo

(57) ABSTRACT

In response to detecting a software build break during testing, a change to a particular file committed to the software build that caused the software build to break is identified. A record of the change to the particular file is added to a sensitivity database, the sensitivity database accumulating multiple records of changes to the files of the software build during development of the software build. A relative level of failure of the particular file from the files of the software build based on the record in comparison with the multiple records is calculated. A sensitivity rating of the particular file to cause breaks in the software build based on the relative level of failure of the particular file weighted by one or more factors is generated. The sensitivity rating is output to one or more integrated development environment interfaces with access to the particular file of the software build.

19 Claims, 13 Drawing Sheets

(56) References Cited

U.S. PATENT DOCUMENTS

2014/0380280 A1* 12/2014 Millwood ............. G06F 11/366
                                                          717/127
2015/0143335 A1   5/2015 Jain et al.
2016/0224908 A1   8/2016 Jagannathan

OTHER PUBLICATIONS

U.S. Appl. No. 15/344,085, filed Nov. 4, 2016, in re Biddle, 91 pages.
Non-final Office Action, dated Jun. 14, 2018, U.S. Appl. No. 15/344,085, filed Nov. 4, 2016, in re Biddle, 30 pages.

* cited by examiner

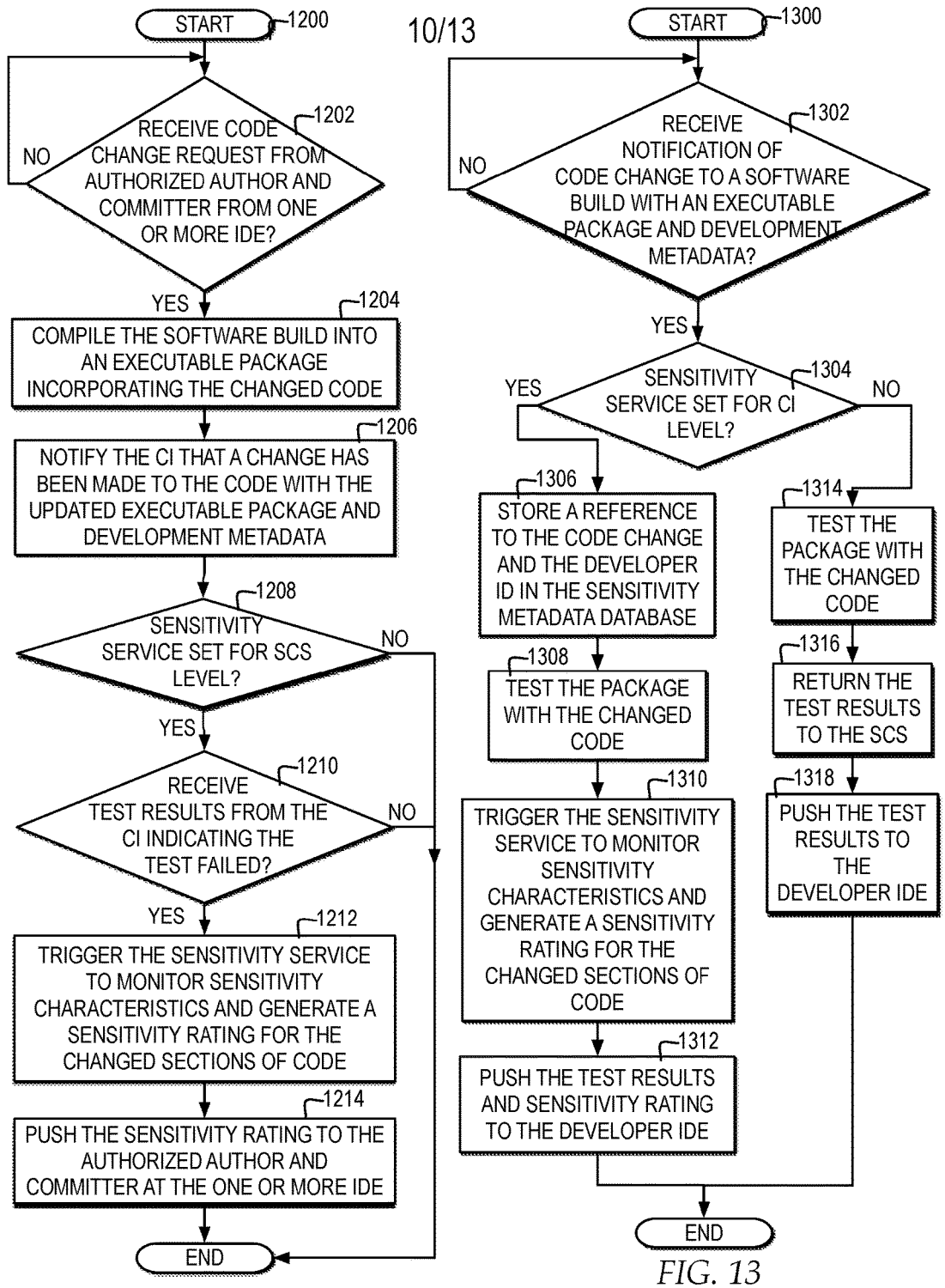

MONITORING CODE SENSITIVITY TO CAUSE SOFTWARE BUILD BREAKS DURING SOFTWARE PROJECT DEVELOPMENT

BACKGROUND

1. Technical Field

The embodiment of the invention relates generally to data processing and particularly to monitoring code sensitivity to cause software build breaks during software project development.

2. Description of the Related Art

When teams of developers work together on a software project to develop a software project, the developers access software build files for the software project, edit the software build files, and commit the edited files to a software build. Each developer may access software build files from a source control system that manages a repository for the software build, tracks the developer changes to the files in the software build, and manages commitment of the edited files to the software build.

When developers edit files and commit the files to the software build, developers often include defects in the edited files that will cause the software build to fail when executed, also referred to as breaking the software build. When large software projects are developed, with many files in the software build, along with multiple developers accessing and editing the many files, it may be difficult to keep track of which files, when changed, cause the software build to break and time may be wasted as developers, through trial and errors, submit edited files that break the software build. A developer learning about the likelihood that edits to a file will break the software build, through trial and error and testing, requires development time and does not provide other developers with this learned understanding that edits to a file are likely to cause a build to break. The developer's rate of gaining an understanding of the importance of the file is also limited by the developer's experience editing a particular software project build and the developer's overall experience level editing code. Moreover, the likelihood that edits to a file to may cause breaks in a software build may be further impacted by the experience level of the developer editing the file, where a developer with less programming experience with a particular type of code function may introduce more errors into a file that cause the file to break the software build than would a developer with more programming experience with the particular type of code function.

A source control system that manages a repository may include a GIT function that tracks metrics of the number of lines of code changed in a file committed to the software build and the number of times a file is committed. Developers may access a GIT report prepared by the GIT function to receive a log of the metrics, which provides some information about the potential importance of a file, however, the number of lines changed in a file and the number of times a file is committed alone does not provide developers with a full understanding of the likelihood that a file may cause breaks in a particular software build because some software builds may have files that are heavily edited, but do not cause the build to break and other software build may have files where a single line edit in the file may cause the software build to break. In addition, the GIT function metrics do not provide any information about the relative experience level of the developer editing the file, however, the relative experience level of the developer editing the file may impact the number of lines the developer edits and the number of times the files is committed with changes. In addition, relying on a developer to interpret the results of the GIT report increases development time and interpretations of the results may vary based on the developer's experience with editing a particular software project build and the developer's overall experience level editing code.

US Publication 20150143335 to Jain et al. describes another tool provided at a source control system that performs steps of analyzing the source code itself and collecting, for a particular file, "code coverage information" comprising "complexity of code, line and branch coverage, "source code violation information" comprising "common programming mistakes and bugs . . . like unused variables, unnecessary object creation, possible null pointer exceptions, dead code, duplicate codes and overcomplicated expressions" identified by a "source code analyzer module 102" searching the source code contents and identifying common bugs, and "source code commit information comprising a committed information of plurality of files within specific time period, a user information of committed plurality of files, a revision change information of lines for each of the plurality of files and a defect information of committed plurality of files." US Publication 20150143335 collects the "code coverage information", "source code violation information", and "source code commit information" for a particular file and publishes the log of information for the particular file in a report. However, Jain et al.'s log of additional information collected about a particular file committed to source code, collected from the contents of that source code alone, does not provide developers with a full understanding of the sensitivity of a file to cause breaks in a particular software build, where some software builds may have files that are heavily edited, but do not cause the build to break and other software build may have files where a single line edit in the file may cause the software build to break. In addition, Jain's log of additional information about a particular file committed to source code does not provide developers with a real-time analysis and assessment of the sensitivity, of a file that causes a break to a particular software build, to cause further breaks in the software build. In addition, US Publication 20150143335 is limited to collecting information about the contents of the source code committed, which does not provide any information about the relative experience level of the developer editing the file, which impacts the contents of the particular file committed.

As the speed of software development continues to accelerate and development teams change from one software project to another software project, there is a need for a method, system and computer program product for supporting software development within software development build environments that minimizes the development time required for identification and mitigation of defects in sections of code of the software build. In addition, as the number of developers on project build teams increases, to efficiently manage the team and minimize redundant errors in files that are more sensitive to cause breaks to the build, there is a need for a method, system, and computer program product for logging more than the contents of the files at the commit level at the source code server.

BRIEF SUMMARY

In view of the foregoing, one or more embodiments of present invention provide for generating a sensitivity rating indicating the sensitivity of each file in a project build to cause breaks in the software build, in real-time, during the development of a software build and providing the sensitivity rating, in real-time, to developers within a development interface, to provide developers with information needed to understand the relative sensitivity of a particular file to cause a break in the build of a particular software project, so that developers can edit code in software projects with knowledge of the relative sensitivity of a file to cause the software build to break, to exercise greater caution when editing files that have a higher sensitivity rating, and to more efficiently produce more robust code that is less sensitive to causing the software build to break. One or more embodiments of the present invention provide for optimizing identification and mitigation of defects in sections of code of the software build by monitoring the sensitivity of a file to cause a break in a particular software build and providing feedback to developers, in real-time, with an assessment of the sensitivity of the file to cause a break in a particular software build, in comparison with the sensitivity of other files in the particular software build. In addition, in view of the foregoing, as the number of developers on project build teams increases, to efficiently manage the team, minimize redundant errors in more sensitivity files that cause breaks to the build, and keep all developers informed, in real-time, about particular files that are more sensitive to causing breaks in the build, one or more embodiments of the present invention provide for logging information about the contents of the files at multiple points in the development process, including logging commit metrics and the results of testing of files at a testing level when build breaks are identified, along with gathering information about which developers edit each file when breaks occur, analyzing and assessing the sensitivity of a file to cause breaks in a software build based on the history of each file and developer editing history, and providing the assessment of the sensitivity of a file to cause breaks to developers in real-time within a software build environment.

In one or more embodiments, a method is directed to, in response to detecting a software build break during testing, identifying a change to a particular file committed to the software build that caused the software build to break during testing, the software build comprising multiple files. The method is directed to adding a particular record of the change to the particular file to a sensitivity database, the sensitivity database accumulating multiple records of changes to the files during development of the software build. The method is directed to calculating a relative level of failure of the particular file from among the files of the software build based on the particular record in comparison with the records. The method is directed to generating a sensitivity rating of the particular file to cause breaks in the software build based on the relative level of failure of the particular file weighted by one or more factors. The method is directed to outputting the sensitivity rating to one or more integrated development environment interfaces with access to the particular file of the software build. One advantage of generating a sensitivity rating of a particular file of a software build based on the relative level of failure of the particular file within the software build is that the rating reflects an analysis of the sensitivity of that particular file within that particular software build, that provides the developer with more information about the actual sensitivity of a file than are provided by metrics indicating the number of lines of code changed or the number of times a files has been committed. In addition, one advantage of outputting the sensitivity rating to one or more integrated development interfaces with access to the particular file is that one or more developers working on the particular file of the software build receive the sensitivity rating in real-time in the interface used to access and develop the software build.

In addition, in one or more embodiments, the method may be directed to adding a particular record of the change to the particular file to a sensitivity database, the sensitivity database accumulating records of changes to the files during development of the software build that further comprises adding a particular record of the change to the particular file to a sensitivity database identifying a particular developer identifier of the developer changing the particular file from among developers. The developers submit changes to the files during development of the software build. The method may be directed to generating a sensitivity rating of the particular file to cause breaks in the software build based on the relative level of failure of the particular file weighted one or more factors that further comprises calculating a developer assessment indicating a frequency that changes to files submitted by the particular developer caused breaks to the software build based on the records and generating the sensitivity rating of the particular file to cause breaks in the software file based on the relative level of failure weighted by the one or more factors comprising the developer assessment. One advantage of accumulating records that indicate the developer identifier associated with each change to a software build, when tracking changes that cause a build to break, is that the frequency at which changes committed by the developer cause build breaks can be calculated and a sensitivity rating for the change to the particular file may reflect the developer assessment for the developer that changed the particular file.

In addition, in one or more embodiments, the step of the method of adding a particular record of the change to the particular file to a sensitivity database, the sensitivity database accumulating records of changes to the files during development of the software build may be directed to tracking, through the records, for each separate file from among the plurality of files, a number of lines per commit of each separate file, a number of times each separate file changed before a break, a size of each separate file, an age of each separate file, and a previously calculated sensitivity rating history for each separate file. One advantage of tracking the number of lines per commit of each file, the number of times each file changed before a break, a size of each file, an age of each file and a previously calculated sensitivity rating history for each file is that each of these metrics alone may not reflect the full sensitivity of a file to break a build if edited, but when evaluated together for a software build, weighted by one or more factors, may provide developers with a holistic assessment of the sensitivity of a file to cause breaks to a build.

In addition, in one or more embodiments, the step of the method of calculating a relative level of failure of the particular file from among the plurality of files of the software build based on the particular record in comparison with the plurality of records may be further directed to calculating a ratio of a number of commits of the particular file that occur before a build break compared with a number of total commits of the particular file. One advantage of calculating a ratio of the number of commits of the particular file that occur before a build break compared with a number of total commits of the particular file is that the relative failure of a particular file to cause breaks in a build may be determined based on the history of development of the particular file in the particular software build.

In addition, in one or more embodiments, the step of the method of outputting the sensitivity rating to one or more integrated development environment interfaces with access to the particular file of the software build may be further directed to detecting a developer identifier of a particular developer from among a plurality of developers that submitted the change to the particular file to be committed to the software build from a particular integrated development environment interface of the one or more integrated development environment interfaces. The method may be further directed to automatically outputting the sensitivity rating and an indicator of the software build break during testing to the particular integrated development environment interface authenticated for the developer identifier. The sensitivity rating and the indicator of the software build break during testing are output to the particular developer in the integrated development environment interface. One advantage of outputting the indicator of a software build break during testing to the developer with a sensitivity rating is that the developer receives a dynamically generated indicator, in real-time, of the relative sensitivity of the particular file to cause a break to the software build and the developer may exercise additional caution when editing the file based on the level of the sensitivity rating.

In addition, in one or more embodiments, the method may be directed to receiving a request from a particular developer identified as an author, from among multiple developers, to commit the change to the particular file to the software build from a particular integrated development environment interface of the one or more integrated development environment interfaces. The method may be directed to accessing, from the sensitivity database, a previously generated sensitivity rating for the particular file and a current developer assessment for the particular developer, the developer assessment comprising a frequency that changes to files submitted by the particular developer caused breaks to the software build based on the records. The method may be directed to outputting the request, with the sensitivity rating updated with the developer assessment, to another integrated development environment interface of the one or more integrated development environment interfaces authenticated for another developer identified as a committer, authorized to commit the change to the particular file to the software build. The sensitivity rating updated with the developer assessment is output to the another developer in the another integrated development environment interface. The method may be directed to, in response to receiving permission from the another developer in response to the request, committing the change to the particular file to the software build and triggering testing of the software build. The method may be directed to, in response to detecting the software build break during testing, automatically outputting the sensitivity rating and an indicator of the software build break during testing to the particular integrated development environment interface authenticated for the particular developer identified as the author. The sensitivity rating and the indicator of the software build break during testing are output to the particular developer in the particular integrated development environment interface. The method may be directed to, in response to detecting the software build break during testing, automatically outputting the sensitivity rating and the indicator of the software build break during testing to the another integrated development environment interface authenticated for the another developer identified as the committer. The sensitivity rating and the indicator of the software build break during testing are output to the another developer in the another integrated development environment interface. One advantage of outputting the previous sensitivity rating with a current developer assessment to the committer, when sending a request to commit a change to a software build, is that the committer receives an assessment that allows the committer to determine the level of review required for the request based on the level of the previously generated sensitivity rating for the particular file and the current developer assessment for the file. In addition, one advantage of outputting the indicator of a software build break during testing to the committer with a sensitivity rating is that the committer receives a dynamically generated indicator, in real-time, of the relative sensitivity of each file committed by the committer that causes the software build to break.

In addition, in one or more embodiments, the method may be directed to storing the sensitivity rating of the particular file in the sensitivity database in association with an identifier for the particular file from among the files. One advantage of storing the sensitivity rating of the particular file in the sensitivity database in association with an identifier for the particular file is that a historical record of the sensitivity ratings generated for a file are accumulated and may be accessed by other developers when accessing the file prior to a next change to the file.

In addition, in one or more embodiments, the method may be directed to, in response to committing the change to the particular file to the software build, notifying a continuous integration system that the change is committed to the particular file and passing the continuous integration system an executable package updated for the software build. The continuous integration system tests the executable package against multiple tests. The continuous integration system determines whether the executable package fails one or more of the tests. The method may be directed to, in response to receiving a testing result from the continuous integration system indicating the executable package fails one or more of the tests, detecting the software build break during testing. One advantage of detecting a software build break during testing at a system other than the continuous integration system performing the testing is that a system other than the system performing testing, such as a source control server, may add the record of the change of the particular file causing the break to the software build.

In addition, in one or more embodiments, the method may be directed to, in response to receiving from a source control system a notification that the change is committed to the particular file by a particular developer from among multiple developers and an executable package updated for the software build with the change, storing a record of the notification to the changed code and the developer identifier in the sensitivity database. The method may be directed to testing the executable package against multiple tests. The continuous integration system determines whether the executable package fails one or more of the tests. The method may be directed to, in response to detecting the executable package fails one or more of the tests, detecting the software build break during testing. One advantage of detecting a software build break during testing at the system performing the testing, such as continuous integration system, is that a system performing the testing may add the record of the change of the particular file causing the break to the software build.

In one or more embodiments, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instruction to, in response to detecting a software build break during testing, identify a change to a particular file committed to the software build that caused the software build to break during testing, the software build comprising multiple files. The stored program instructions comprise program instruction to add a particular record of the change to the particular file to a sensitivity database, the sensitivity database accumulating multiple records of changes to the files during development of the software build. The stored program instructions comprise program instruction to calculate a relative level of failure of the particular file from among the files of the software build based on the particular record in comparison with the records. The stored program instructions comprise program instructions to generate a sensitivity rating of the particular file to cause breaks in the software build based on the relative level of failure of the particular file weighted one or more factors. The stored program instructions comprise program instructions to output the sensitivity rating to one or more integrated development environment interfaces with access to the particular file of the software build. One advantage of generating a sensitivity rating of a particular file of a software build based on the relative level of failure of the particular file within the software build is that the rating reflects an analysis of the sensitivity of that particular file within that particular software build, that provides the developer with more information about the actual sensitivity of a file than are provided by metrics indicating the number of lines of code changed or the number of times a files has been committed. In addition, one advantage of outputting the sensitivity rating to one or more integrated development interfaces with access to the particular file is that one or more developers working on the particular file of the software build receive the sensitivity rating in real-time in the interface used to access and develop the software build.

In addition, in one or more embodiments, the computer system may comprise stored program instructions to add a particular record of the change to the particular file to a sensitivity database identifying a particular developer identifier of the developer changing the particular file from among developers. The developers submit changes to the files during development of the software build. The computer system may comprise stored program instructions to calculate a developer assessment indicating a frequency that changes to files submitted by the particular developer caused breaks to the software build based on the records and generate the sensitivity rating of the particular file to cause breaks in the software file based on the relative level of failure weighted by the one or more factors comprising the developer assessment. One advantage of accumulating records that indicate the developer identifier associated with each change to a software build, when tracking changes that cause a build to break, is that the frequency at which changes committed by the developer cause build breaks can be calculated and a sensitivity rating for the change to the particular file may reflect the developer assessment for the developer that changed the particular file.

In addition, in one or more embodiments, the stored program instructions to calculate a relative level of failure of the particular file from among the plurality of files of the software build based on the particular record in comparison with the plurality of records may further comprise stored program instructions to calculate a ratio of a number of commits of the particular file that occur before a build break compared with a number of total commits of the particular file. One advantage of calculating a ratio of the number of commits of the particular file that occur before a build break compared with a number of total commits of the particular file is that the relative failure of a particular file to cause breaks in a build may be determined based on the history of development of the particular file in the particular software build.

In addition, in one or more embodiments, the stored program instructions to output the sensitivity rating to one or more integrated development environment interfaces with access to the particular file of the software build may further comprise stored program instructions to detect a developer identifier of a particular developer from among a plurality of developers that submitted the change to the particular file to be committed to the software build from a particular integrated development environment interface of the one or more integrated development environment interfaces. The computer system may further comprise stored program instructions to automatically output the sensitivity rating and an indicator of the software build break during testing to the particular integrated development environment interface authenticated for the developer identifier. The sensitivity rating and the indicator of the software build break during testing are output to the particular developer in the integrated development environment interface. One advantage of outputting the indicator of a software build break during testing to the developer with a sensitivity rating is that the developer receives a dynamically generated indicator, in real-time, of the relative sensitivity of the particular file to cause a break to the software build and the developer may exercise additional caution when editing the file based on the level of the sensitivity rating.

In addition, in one or more embodiments, the computer system may comprise stored program instructions to receive a request from a particular developer identified as an author, from among multiple developers, to commit the change to the particular file to the software build from a particular integrated development environment interface of the one or more integrated development environment interfaces. The computer system may comprise stored program instructions to access, from the sensitivity database, a previously generated sensitivity rating for the particular file and a current developer assessment for the particular developer, the developer assessment comprising a frequency that changes to files submitted by the particular developer caused breaks to the software build based on the records. The computer system may comprise stored program instructions to output the request, with the sensitivity rating updated with the developer assessment, to another integrated development environment interface of the one or more integrated development environment interfaces authenticated for another developer identified as a committer, authorized to commit the change to the particular file to the software build. The sensitivity rating updated with the developer assessment is output to the another developer in the another integrated development environment interface. The computer system may comprise stored program instructions to, in response to receiving permission from the another developer in response to the request, commit the change to the particular file to the software build and triggering testing of the software build. The computer system may comprise stored program instructions to, in response to detecting the software build break during testing, automatically output the sensitivity rating and an indicator of the software build break during testing to the particular integrated development environment interface authenticated for the particular developer identified as the author. The sensitivity rating and the indicator of the software build break during testing are output to the particular developer in the particular integrated development environment interface. The computer system may comprise stored program instructions to, in response to detecting the software build break during testing, automatically output the sensitivity rating and the indicator of the software build break during testing to the another integrated development environment interface authenticated for the another developer identified as the committer. The sensitivity rating and the indicator of the software build break during testing are output to the another developer in the another integrated development environment interface. One advantage of outputting the previous sensitivity rating with a current developer assessment to the committer, when sending a request to commit a change to a software build, is that the committer receives an assessment that allows the committer determine the level of review required for the request based on the level of the previously generated sensitivity rating for the particular file and the current developer assessment for the file. In addition, one advantage of outputting the indicator of a software build break during testing to the committer with a sensitivity rating is that the committer receives a dynamically generated indicator, in real-time, of the relative sensitivity of each file committed by the committer that causes the software build to break.

In addition, in one or more embodiments, the computer system may comprise stored program instructions to store the sensitivity rating of the particular file in the sensitivity database in association with an identifier for the particular file from among the files. One advantage of storing the sensitivity rating of the particular file in the sensitivity database in association with an identifier for the particular file is that a historical record of the sensitivity ratings generated for a file are accumulated and may be accessed by other developers when accessing the file prior to a next change to the file.

In addition, in one or more embodiments, the computer system may comprise stored program instructions to, in response to committing the change to the particular file to the software build, notify a continuous integration system that the change is committed to the particular file and passing the continuous integration system an executable package updated for the software build. The continuous integration system tests the executable package against multiple tests. The continuous integration system determines whether the executable package fails one or more of the tests. The computer system may comprise stored program instructions to, in response to receiving a testing result from the continuous integration system indicating the executable package fails one or more of the tests, detect the software build break during testing. One advantage of detecting a software build break during testing at a system other than the continuous integration system performing the testing is that a system other than the system performing testing, such as a source control server, may add the record of the change of the particular file causing the break to the software build.

In addition, in one or more embodiments, the computer system may comprise stored program instructions to, in response to receiving from a source control system a notification that the change is committed to the particular file by a particular developer from among multiple developers and an executable package updated for the software build with the change, store a record of the notification to the changed code and the developer identifier in the sensitivity database. The computer system may comprise stored program instructions to test the executable package against multiple tests. The continuous integration system determines whether the executable package fails one or more of the tests. The computer system may comprise stored program instructions to, in response to detecting the executable package fails one or more of the tests, detect the software build break during testing. One advantage of detecting a software build break during testing at the system performing the testing, such as continuous integration system, is that a system performing the testing may add the record of the change of the particular file causing the break to the software build.

In one or more embodiments, a computer program product comprises a computer readable storage medium having program instructions embodied therewith. The computer readable storage medium is not a transitory signal per se. The program instructions are executable by a computer to cause the computer to, in response to detecting a software build break during testing, identify, by the computer, a change to a particular file committed to the software build that caused the software build to break during testing, the software build comprising multiple files. The program instructions are executable by a computer to cause the computer to add, by the computer, a particular record of the change to the particular file to a sensitivity database, the sensitivity database accumulating multiple records of changes to the files during development of the software build. The program instructions are executable by a computer to cause the computer to calculate, by the computer, a relative level of failure of the particular file from among the files of the software build based on the particular record in comparison with the records. The program instructions are executable by a computer to cause the computer to generate, by the computer, a sensitivity rating of the particular file to cause breaks in the software build based on the relative level of failure of the particular file weighted by one or more factors. The program instructions are executable by a computer to cause the computer to output, by the computer, the sensitivity rating to one or more integrated development environment interfaces with access to the particular file of the software build. One advantage of generating a sensitivity rating of a particular file of a software build based on the relative level of failure of the particular file within the software build is that the rating reflects an analysis of the sensitivity of that particular file within that particular software build, that provides the developer with more information about the actual sensitivity of a file than are provided by metrics indicating the number of lines of code changed or the number of times a files has been committed. In addition, one advantage of outputting the sensitivity rating to one or more integrated development interfaces with access to the particular file is that one or more developers working on the particular file of the software build receive the sensitivity rating in real-time in the interface used to access and develop the software build.

In addition, in one or more embodiments, the computer program product may comprise the program instructions executable by a computer to cause the computer to add, by the computer, a particular record of the change to the particular file to a sensitivity database identifying a particular developer identifier of the developer changing the particular file from among developers. The developers submit changes to the files during development of the software build. The program instructions may be executable by a computer to cause the computer to calculate, by the computer, a developer assessment indicating a frequency that changes to files submitted by the particular developer caused breaks to the software build based on the records and generate the sensitivity rating of the particular file to cause breaks in the software file based on the relative level of failure weighted by the one or more factors comprising the developer assessment. One advantage of accumulating records that indicate the developer identifier associated with each change to a software build, when tracking changes that cause a build to break, is that the frequency at which changes committed by the developer cause build breaks can be calculated and a sensitivity rating for the change to the particular file may reflect the developer assessment for the developer that changed the particular file.

In addition, in one or more embodiments, the computer program product may comprise program instructions executable by a computer to add, by the computer, a particular record of the change to the particular file to a sensitivity database, the sensitivity database accumulating records of changes to the files during development of the software build may be directed to tracking, through the records, for each separate file from among the plurality of files, a number of lines per commit of each separate file, a number of times each separate file changed before a break, a size of each separate file, an age of each separate file, and a previously calculated sensitivity rating history for each separate file. One advantage of tracking the number of lines per commit of each file, the number of times each file changed before a break, a size of each file, an age of each file and a previously calculated sensitivity rating history for each file is that each of these metrics alone may not reflect the full sensitivity of a file to break a build if edited, but when evaluated together for a software build, weighted by one or more factors, may provide developers with a holistic assessment of the sensitivity of a file to cause breaks to a build.

In addition, in one or more embodiments, the computer program product may comprise the program instructions executable by a computer to calculate, by the computer, a relative level of failure of the particular file from among the plurality of files of the software build based on the particular record in comparison with the plurality of records may be further directed to calculating a ratio of a number of commits of the particular file that occur before a build break compared with a number of total commits of the particular file. One advantage of calculating a ratio of the number of commits of the particular file that occur before a build break compared with a number of total commits of the particular file is that the relative failure of a particular file to cause breaks in a build may be determined based on the history of development of the particular file in the particular software build.

In addition, in one or more embodiments, the computer program product may comprise the program instructions executable by a computer to detect, by the computer, a developer identifier of a particular developer from among a plurality of developers that submitted the change to the particular file to be committed to the software build from a particular integrated development environment interface of the one or more integrated development environment interfaces. The computer program product may comprise the program instructions executable by a computer to automatically output, by the computer, the sensitivity rating and an indicator of the software build break during testing to the particular integrated development environment interface authenticated for the developer identifier. The sensitivity rating and the indicator of the software build break during testing are output to the particular developer in the integrated development environment interface. One advantage of outputting the indicator of a software build break during testing to the developer with a sensitivity rating is that the developer receives a dynamically generated indicator, in real-time, of the relative sensitivity of the particular file to cause a break to the software build and the developer may exercise additional caution when editing the file based on the level of the sensitivity rating.

In addition, in one or more embodiments, the computer program product may comprise the program instructions executable by a computer to receive, by the computer, a request from a particular developer identified as an author, from among multiple developers, to commit the change to the particular file to the software build from a particular integrated development environment interface of the one or more integrated development environment interfaces. The computer program product may comprise the program instructions executable by a computer to access, by the computer, from the sensitivity database, a previously generated sensitivity rating for the particular file and a current developer assessment for the particular developer, the developer assessment comprising a frequency that changes to files submitted by the particular developer caused breaks to the software build based on the records. The computer program product may comprise the program instructions executable by a computer to output, by the computer, the request, with the sensitivity rating updated with the developer assessment, to another integrated development environment interface of the one or more integrated development environment interfaces authenticated for another developer identified as a committer, authorized to commit the change to the particular file to the software build. The sensitivity rating updated with the developer assessment is output to the another developer in the another integrated development environment interface. The computer program product may comprise the program instructions executable by a computer to, in response to receiving permission from the another developer in response to the request, commit, by the computer, the change to the particular file to the software build and triggering testing of the software build. The computer program product may comprise the program instructions executable by a computer to, in response to detecting the software build break during testing, automatically output, by the computer, the sensitivity rating and an indicator of the software build break during testing to the particular integrated development environment interface authenticated for the particular developer identified as the author. The sensitivity rating and the indicator of the software build break during testing are output to the particular developer in the particular integrated development environment interface. The computer program product may comprise the program instructions executable by a computer to, in response to detecting the software build break during testing, automatically output, by the computer, the sensitivity rating and the indicator of the software build break during testing to the another integrated development environment interface authenticated for the another developer identified as the committer. The sensitivity rating and the indicator of the software build break during testing are output to the another developer in the another integrated development environment interface. One advantage of outputting the previous sensitivity rating with a current developer assessment to the committer, when sending a request to commit a change to a software build, is that the committer receives an assessment that allows the committer determine the level of review required for the request based on the level of the previously generated sensitivity rating for the particular file and the current developer assessment for the file. In addition, one advantage of outputting the indicator of a software build break during testing to the committer with a sensitivity rating is that the committer receives a dynamically generated indicator, in real-time, of the relative sensitivity of each file committed by the committer that causes the software build to break.

In addition, in one or more embodiments, the computer program product may comprise the program instructions executable by a computer to store, by the computer, the sensitivity rating of the particular file in the sensitivity database in association with an identifier for the particular file from among the files. One advantage of storing the sensitivity rating of the particular file in the sensitivity database in association with an identifier for the particular file is that a historical record of the sensitivity ratings generated for a file are accumulated and may be accessed by other developers when accessing the file prior to a next change to the file.

In addition, in one or more embodiments, the computer program product may comprise the program instructions executable by a computer to, in response to committing the change to the particular file to the software build, notify, by the computer, a continuous integration system that the change is committed to the particular file and passing the continuous integration system an executable package updated for the software build. The continuous integration system tests the executable package against multiple tests. The continuous integration system determines whether the executable package fails one or more of the tests. The computer program product may comprise the program instructions executable by a computer to, in response to receiving a testing result from the continuous integration system indicating the executable package fails one or more of the tests, detect, by the computer, the software build break during testing. One advantage of detecting a software build break during testing at a system other than the continuous integration system performing the testing is that a system other than the system performing testing, such as a source control server, may add the record of the change of the particular file causing the break to the software build.

In addition, in one or more embodiments, the computer program product may comprise the program instructions executable by a computer to, in response to receiving from a source control system a notification that the change is committed to the particular file by a particular developer from among multiple developers and an executable package updated for the software build with the change, store, by the computer, a record of the notification to the changed code and the developer identifier in the sensitivity database. The computer program product may comprise the program instructions executable by a computer to test, by the computer, the executable package against multiple tests. The continuous integration system determines whether the executable package fails one or more of the tests. The computer program product may comprise the program instructions executable by a computer to, in response to detecting the executable package fails one or more of the tests, detect, by the computer, the software build break during testing. One advantage of detecting a software build break during testing at the system performing the testing, such as continuous integration system, is that a system performing the testing may add the record of the change of the particular file causing the break to the software build.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 12 illustrates one example of a high level logic flowchart of a process and computer program for managing a sensitivity service at an SCS level in response to committing code changes to a software build;

FIG. 13 illustrates one example of a high level logic flowchart of a process and computer program for managing a sensitivity service at a CI level in response to receiving a code change notice for software build;

DETAILED DESCRIPTION

In the following description, for the purposes of explanation, numerous specific details are set forth in order to provide a thorough understanding of one or more embodiments of the present invention. It will be apparent, however, to one skilled in the art that the one or more embodiments of the present invention may be practiced without these specific details. In other instances, well-known structures and devices are shown in block diagram form in order to avoid unnecessarily obscuring the one or more embodiments of the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
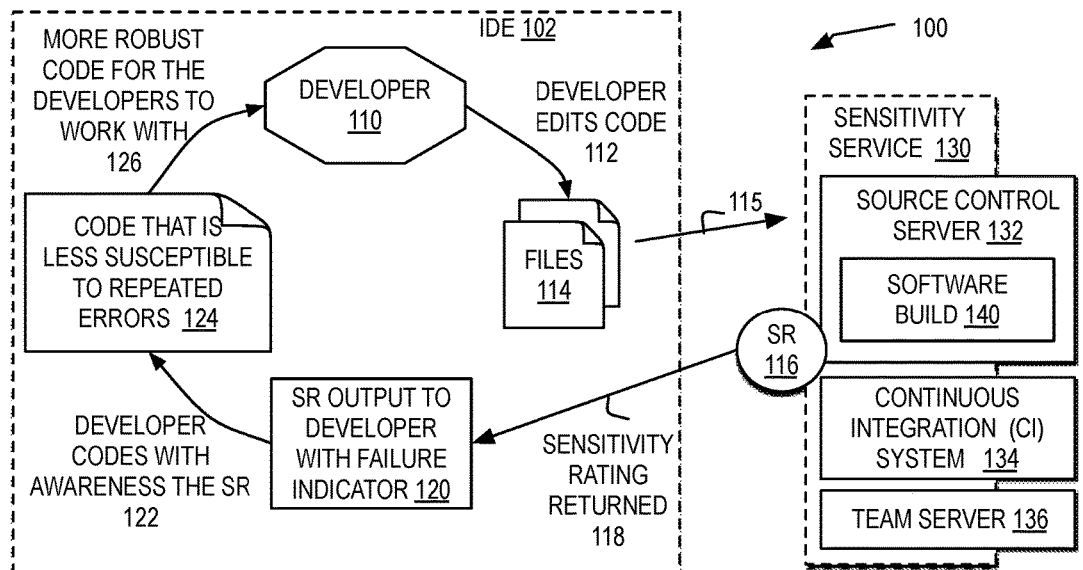
FIG. 1 illustrates one example of a block diagram of one example of a software project development model for monitoring code sensitivity during software project development.

FIG. 1 illustrates a block diagram of one example of a software project development model for monitoring code sensitivity during software project development.

In one example, a software project development environment 100 illustrates one example of a software project development environment in which one or more software developers edit code for a software build 140 and receive automated feedback of a sensitivity rating, in real-time, in addition to or as an alternative to receiving an indicator that a recent change to a section of code has broken software build 140 during testing. In one example, as illustrated at reference numeral 112, a software developer 110 working within an integrated development environment (IDE) 102, edits code within one or more files 114. In one example, IDE 102 may represent an instance of a software application that provides one or more components for software development within a single program. In one example, IDE 102 may include, but is not limited to, a source code editor, build automation tools, a debugger, intelligent code completion, compiler, interpreter, version control system, class browser, object browser, and a class hierarchy diagram. In one example, IDE 102 may be supported by one or more multi-language IDEs including, but not limited to, Eclipse IDE, ORACLE® JDeveloper, NetBeans IDE, and DELPHI®. In additional or alternate examples, IDE 102 may also include one or more additional or alternate components for supporting management functions during software development and for supporting planning functions during software development. In additional or alternate examples, software project development environment 100 may include multiple instances of IDE 102.

In one example, within software project development environment 100, IDE 102 may interact with one or more additional development systems, including, but not limited to a source control server (SCS) 132, a continuous integration (CI) system 134, and a team server 136. For example, as illustrated at reference numeral 115, files 114, as edited by developer 110, are sent to SCS 132. In one example, SCS 132 may provide a service for managing storage of the multiple files of a software build 140 during development of the software project. In one example, SCS 132 may also represent a source control management (SCM) system. In one example, software build 140 may include multiple files with code that is editable by one or more software developers authorized to access software build 140 from SCS 132. In one example, each developer 110 may work within an interface of an instance of IDE 102 to access files from software build 140 and locally edit code within one or more accessed files. In one example, each software developer may select to push the locally edited code in files 114 to SCS 132 with a request to commit the files to software build 140, as illustrated at reference numeral 115. As multiple developers access and work on a same selection of files from software build 140, SCS 132 may manage mergers of changes to the code within the same files by different developers from different IDE instances.

In one example, for SCS 132 to commit files 114 into software build 140, SCS 132 may require one or more levels of review of files 114 prior to committing the files into software build 140. In one example, developer 110 may represent a programmer who is authorized as both an author and as a committer, where no additional level of review is required for SCS 132 to commit files pushed by the programmer to software build 140. In another example, developer 110 may represent a programmer who is authorized as an author, with additional levels of review required by another developer who is authorized as a committer. In one example, when SCS 132 receives a commit request from a developer that requires additional levels of review prior to commit, SCS 132 may first prompt another developer authorized as a committer to review the request and authorize the commit of files 114 to the software build 140.

In one example, CI system 134 may provide a service for running a series of tests on code committed to software build 140. In one example, when developer 110 commits files 114 to SCS 132, SCS 132 updates the code within software build 140 based on the updates in files 114 and compiles the multiple files of software build 140 into an executable package that can be tested. Alternatively, SCS 132 may notify CI system 134 that software build 140 has been updated and CI system 134 may compile the multiple files of software build 140 into an executable package testable for testing by CI system 134. CI program system 134 runs a series of tests on the executable package. If the test fails, CI program system 134 may return an indicator to IDE 102 that the test failed, indicating that the edited code in files 114 broke the build of software build 140.

In one example, the embodiment in FIG. 1 provides the advantage of a sensitivity service 130 which is useful for monitoring for characteristics of commits of files that are indicative of the relative sensitivity of the file to cause software build 140 to break, for generating a sensitivity rating indicating the sensitivity of the file to cause software build 140 to break, and for reporting the sensitivity rating, in real-time, to one or more developers working to develop software build 140. Advantageously, elements of sensitivity service 130 may be integrated within or accessed by one or more of components within software project development environment 100 including, but not limited to, IDE 102, SCS 132, CI program system 134, and team server 136. In one example, sensitivity service 130 may represent a service that dynamically evaluates an objective level of importance of individual sections of code within software build 140 based on real-time metrics and generates a sensitivity rating (SR) 116 indicating the importance of individual sections of code within software build 140. In particular, SR 116 may reflect the sensitivity that a particular section of code within software build 140 has to breaking the build or the risk that a particular section of code within software build 140 may cause build errors or include defects. Advantageously, SR 116 may also provide an indicator of the need for developers to exercise caution when changing a particular section of code within software build 140.

In one example, software project development environment 100 may facilitate multiple developers concurrently committing files to SCS 132 for software build 140 from multiple instances of IDE 102, each developer with varying levels of expertise with coding in general and with coding for the software build and varying levels of exposure to a whole project development plan, and may also include one or more developers with different levels of authorization to review and commit files to the software build 140. Sensitivity service 130 generates SR 116, which holistically reflects the sensitivity of a section of code that causes software build 140 to fail during testing based on the tracked interactions of the developer who has edited a section of code and the interactions of all the developers with a section of code. In one example, the sensitivity of a section of code to cause software build 140 to fail, may also be referred to as the sensitivity or likelihood that a section of code will break when edited. SR 116, generated for each section of code, may be accessed by developers, managers, and others and is useful for evaluating the relative sensitivity of each section of code software build 140 and for evaluating which sections of code may require additional attention or resources. In addition, once a software project for software build 140 is complete, storing the sensitivity rating generated for each section of code is useful because the sensitivity ratings may be inserted into metadata for the section of code so that as the code for software build 140 is reused for a new software project, the previously generated sensitivity of particular sections of code is provided to the development team of the new software project.

In particular, in the example, through successive changes to code in files committed to software build 140 by one or more developers, sensitivity service 130 may collect sensitivity metadata for each section of code and determine the sensitivity of each section of code to software build 140 based on the sensitivity metadata as weighted by one or more sensitivity factors. In one example, sensitivity metadata may include, but is not limited to, the number of times that a section of code has been involved in a build error, the amount of lines of code changed per commit, the number of times a section of code was changed before causing a break, the frequency of changes to a section of code, the developer identifier of the developer changing the section of code and the assessment of the developer, the age and size of a file including a section of code, the previous sensitivity ratings for a section of code, why tests failed, and what specific files caused a build to break. In one example, by sensitivity service 130 collecting metrics indicative of sensitivity characteristics of a section of code, sensitivity metadata 130 may analyze and assess the sensitivity characteristics of a section of code to generate a sensitivity rating provided to developers, which allows all developers to receive a same weighted assessment of the sensitivity of a particular file, rather than requiring each developer to spend development time evaluating the underlying metrics alone.

In one example, sensitivity metadata may be collected for a section of code designated by one or more code units including, but not limited to, by package, by file, and by section of a file and further specified by functions, methods, or classes. As described herein, where references are made to a section of code or to a file, other code units may also apply. One advantage of collecting sensitivity metadata for code units that may include multiple sections of code in a single file is that if sections of code represent functions that are moved from one file to another file, the sensitivity metadata collected for the function may be tracked independent of a particular file. In addition, another advantage of collecting sensitivity metadata for code units that may include multiple sections of code is that different developers may work on different sections of code within a single file and the sensitivity metadata may include developer IDs specified by the section of code edited within a file.

In one example, SR 116 may include multiple sensitivity ratings, each specified for a separate section of code. In one example, the rating within SR 116 may include one or more types of data. For example, SR 116 may include a numerical or textual value indicating the relative sensitivity of a section of code to breaking, indicated as a score, percentage, or level. In another example, the rating within SR 116 may include one or more characteristics within the sensitivity metadata collected by sensitivity service 130 and evaluated in determining SR 116.

In one example, sensitivity service 130 may return SR 116, indicating the sensitivity of a section of code, to IDE 102 and to other instances of IDE 102 or other interfaces authorized to receive SR 116. For example, as illustrated at reference numeral 118, in response to developer 110 editing code and committing files 114 to SCS 132 for software product build 140, IDE 102 receives SR 116 for one or more sections of code in files 114 from sensitivity service 130 and outputs SR 116 to developer 110, with a failure indicator, within an interface of IDE 102, as illustrated at reference numeral 120. In one example, as illustrated at reference numeral 122, by providing SR 116 to the software developer within an interface of IDE 102, developer 110 is enabled to edit each section of code within IDE 102 with an awareness of the SR for each section of code, as returned in SR 116. In one example, by providing a developer with an indicator of the sensitivity of each section of code when edited code within files 114 causes a break in the build of software build 140, developer 110 is provided with an indicator of the sensitivity that particular sections of code within files 114 have to breaking the build. In one embodiment, providing developer 110 with an indicator of the sensitivity of a particular section of code of a software project is useful because the sensitivity rating may provide developer 110 with an indicator of the level of caution the developer may need to exercise when making changes to the particular section of code. For example, if a particular section of code has a higher SR, developer 110 may exercise greater caution or consider structuring the section of code with coding options that are less error prone when making changes to the section of code. In addition, if a particular section of code has a higher SR, the higher SR may provide an indication that a section of code is critically sensitive to software product build 140 and requires selection of a developer with a particular skill level to make changes to the section of code to reduce the likelihood of producing code that is susceptible to repeated errors.

As illustrated at reference numeral 124, an advantage of providing the SR within a code editing interface within IDE 102 is that the SR provides a real-time indicator of the sensitivity of a particular section of code, and as a result the developer may direct additional attention to editing the code, such that the code is less susceptible to repeated errors. In addition, as illustrated at reference numeral 126, as each developer working on software product build 140 produces code that is less susceptible to repeated errors, the code available for all the developers of software product build 140 to work with is more robust and includes objective sensitivity information for other developers to review from the SR stored for each file. Advantageously, as more robust code is developed as a result of developers coding with an awareness of the SR of each section of code of software build 140, tracking the SR levels of the sections of code of a software project, and focusing quality assurance efforts on the sections of code with higher SR levels, sensitivity service 130 minimizes the amount of time required for assuring the quality of software build 140 during development. Further, advantageously, as more robust code is developed as a result of developers coding with an awareness of the SR of each section of code of software build 140, the overall speed of developing a new software project reusing portions or all of software build 140 may increase because the SR of each file is provided to indicate which section of code requires additional attention from the new software project development team.

In one example, in the product development cycle of a software project, traditionally, an initial team of developers may plan the development stream and assign tasks among the initial group of developers to facilitate connectedness among developers to develop a cohesive, quality product, but also facilitate autonomy of each developer to work on specific functions and portions of code. In addition, a software developer or team of software developers may join the development of a software project after the initial planning and need to efficiently determine which sections of the software build to focus on. An advantage of integrating sensitivity service 130 into software development build environment 100 is that a joining developer may view the robust code illustrated at reference numeral 126, including indicators of which sections of code include a higher SR, and efficiently focus efforts on correcting the code in the sections of code that have the highest SR. In addition, a joining developer may view the robust code illustrated at reference numeral 126, including the SR of each section of code, and quickly understand which sections of code of the software build are more prone to cause breaks, which facilitates developer autonomy when multiple developers are working on the same software project.

In another example, when IDE 102 is provided as a cloud based development service, by the nature of the cloud, developers are more likely to be physically dispersed and may not be present during the development planning stages of a software project. An advantage of integrating sensitivity service 130 into software development build environment 100 is that sensitivity service 130 provides developers joining a development stream via cloud based development services with the SR of each file, which supports a connectedness between multiple developers working on a same software project, while also supporting the autonomy of developers working from remote locations.

In one example, team server 136 provides a system for collecting and maintaining information about developers and groups of developers working on one or more software builds managed by one or more SCSs. In one example, IDE 102 may regularly call out to team server 136 for selected information about the development of a software build. In particular, in one example, team server 136 may maintain a database that maintains build activities by developer ID, group ID, and other types of user IDs of users authorized to participate in a software project development environment 100. In one example, a developer ID may include an identifier of an author of edited code and an identifier of the committer of edited code. In one example, a group ID may identify a particular group of developers that a particular developer is assigned to according to one or more criteria, such as, but not limited to, a software project group assignment, a location based group assignment, and a code function based group assignment.

In one example, team server 136 may request and maintain a current developer assessment and group assessment for each developer ID and group ID across one or more software builds. In one example, to integrate an SR based developer assessment and group assessment into the information maintained by team server 136, sensitivity service 130 may collect the SRs for each section of code for one or more software builds according to one or more of a developer ID or a group ID associated with each section of code. In real-time or periodically, from the collected SRs for each section of code from one or more software builds, sensitivity service 136 may analyze the history of SRs for a particular developer ID or group ID and collect statistics about the performance of the particular developer ID or group ID based on the SRs stored with the developer ID. From the collected statistics, sensitivity service 130 may generate a developer assessment or group assessment for each developer ID or group ID. In one example, the assessment may reflect a frequency at which files committed by a developer or group break a build in comparison to the number of files committed by the developer or group. In another example, the assessment may reflect the frequency that a particular developer submits commits that break the software build in comparison with levels of build break frequency for all developers, further subdivided into levels of low, average, or high. In response to a call out to team server 136 from IDE 102, team server 136 may return a developer assessment for a developer ID or a group assessment for a group ID as generated by sensitivity service 130.

Figure 2:
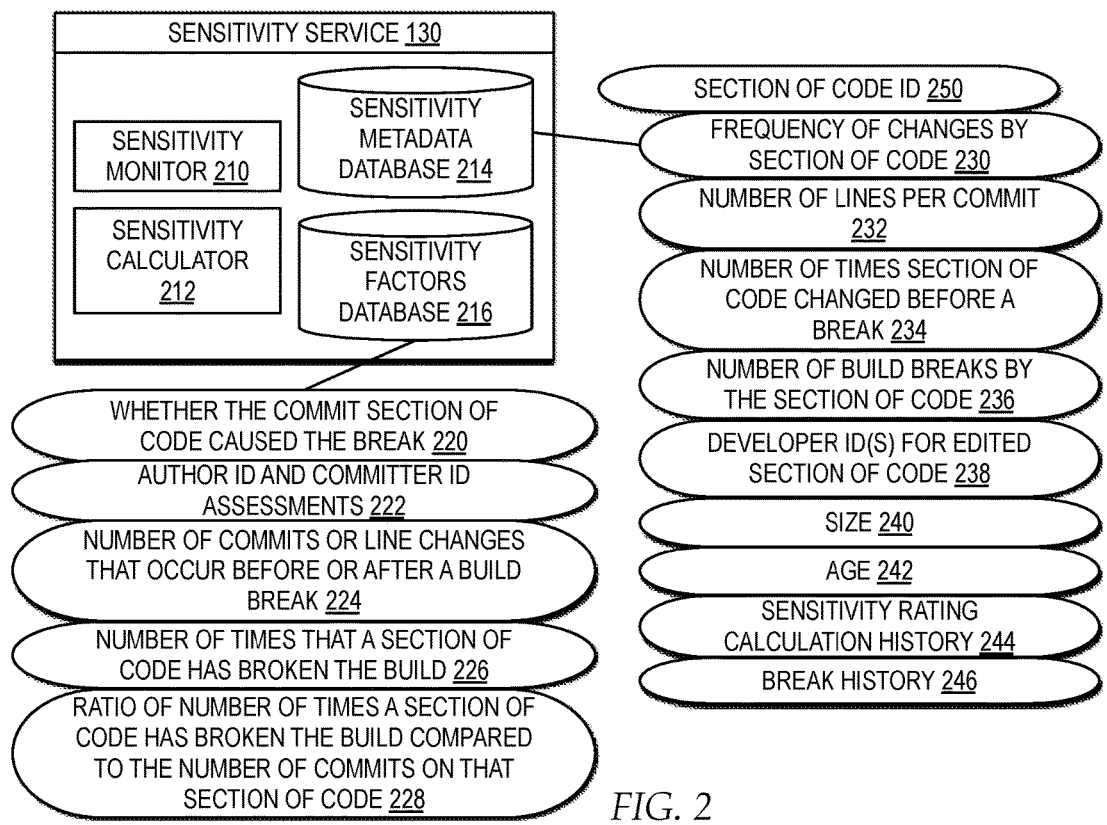
FIG. 2 illustrates one example of a block diagram of components of a sensitivity service for monitoring code sensitivity during software project development.

FIG. 2 illustrates one example of a block diagram of components of a sensitivity service for monitoring code sensitivity during software project development.

In one example, sensitivity service 130 may implement a sensitivity monitor 210 and a sensitivity metadata database 214. In one example, sensitivity monitor 210 may monitor the files committed by a developer to SCS 132 and the testing performed by CI system 134 to identify one or more characteristics of one or more sections of code committed by the developer and of the development of a software project. In one example, sensitivity monitor 210 may store the one or more characteristics of a section of code identifier by section of code ID 250, as historical sensitivity metadata in sensitivity metadata database 214 and may accumulate data assigned to section of code ID 250 based one multiple commits of the section of code to SCS 132. In one example, section of code ID 250 may be identified within sensitivity metadata database by one or more types of identifiers, such as, but not limited to, a line identifier, a function identifier, a module identifier, a file identifier and a software build identifier.

In one example, examples of one or more characteristics of a section of code that may be accumulated by sensitivity monitor 210 in sensitivity metadata database 214 in association with section of code ID 250 may include, but are not limited to, a frequency of changes by section of code 230, a number of lines per commit 232, a number of times a section of code is changed before a break 234, a number of build breaks by the section of code 236, developer ID(s) for an edited section of code 238, a section of code size 240, a section of code age 242, a sensitivity rating calculation history 244, and a break history 246 of the test results and other indicators of what caused a break for each section of code. In one example, developer ID(s) for an edited section of code 238 may include an author ID of the programmer editing code and a committer ID of the user who authorizes a commit of edited files to a software build.

In one example, sensitivity service 130 may also implement a sensitivity calculator 212 and a sensitivity factors database 216. In one example, sensitivity calculator 212 may evaluate sensitivity characteristics in sensitivity metadata database 214 against one or more factors in sensitivity factors database 216, to determine a relative sensitivity of each section of code a software build and to calculate one or more sensitivity ratings based on the relative sensitivity of each section of code within a software build. In the example, sensitivity calculator 212 may generate a sensitivity rating for a section of code based on the relative sensitivity of each section of code.

In one example, sensitivity factors database 216 may include factors that are weighted for determining the sensitivity of a section of code. In one example, sensitivity factors database 216 may include, but is not limited to, weights for whether the committed section of code caused the break 220, a author ID and committer ID rating 222, a number of commits or line changes that occur before or after a build break 224, a number of times that a section of code has broken the build 226, and a ratio of a number of times a section of code has broken the build compared to the number of commits on the section of code 228. In one example, the weight applied for the factor of whether the commit section of code breaks 220 may include a positive weight if a break occurs and a negative weight if a break does not occur. In one example, the weight applied for the factor of the developer ID assessment 222 may include a weight to apply to an average sensitivity rating accumulated for a particular developer ID within sensitivity metadata database 214 when calculating a sensitivity rating.

In one example, sensitivity service 130 may be triggered to provide a sensitivity rating during one or more time periods, for one or more sections of code, by one or more developers or systems within a software project development environment. In response to sensitivity service 130 being triggered to provide a sensitivity rating, sensitivity monitoring 210 may gather one or more sensitivity characteristics of the current software build and store the one or more sensitivity characteristics in sensitivity metadata database 214. Sensitivity calculator 212 may access the current sensitivity characteristics and historical sensitivity metadata related to the build from sensitivity metadata database 214, generate one or more sensitivity ratings for one or more sections of code in the current build based on the current sensitivity characteristics and relevant historical sensitivity metadata evaluated against one or more sensitivity factors in sensitivity factors database 216, pass one or more sensitivity ratings to at least one authorized developer, and store the one or more sensitivity ratings with the sensitivity characteristics of the current build in sensitivity metadata database 214.

In one example, sensitivity service 130 may monitor for test responses that include indicators of build breaks and automatically generate a sensitivity rating when a build break occurs during development. For example, in response to sensitivity service 130 detecting a build break during testing, sensitivity monitor 210 may identify one or more characteristics of the current build and historical sensitivity metadata from sensitivity metadata database 214 for the broken build that indicate which section of code broke the build, how many times the section of code has broken the build, the developer IDs associated with the file that broke the build, and any other sensitivity factor requirements. In one example, sensitivity calculator 212 may evaluate a relative level of failure of the section of code in the software build in comparison to other sections of code that have broken the build, the number of times other sections have broken the build, and the developer IDs associated with build breaks, and other sensitivity factors. Sensitivity calculator 212 may generate a sensitivity rating based on the relative level of failure of the section of code and store the sensitivity rating in sensitivity metadata database 214.

In one example, advantageously, sensitivity service 130 may generate a sensitivity rating for a section of code that is based on an accumulation of multiple characteristics of a section of code and weighted by multiple factors in sensitivity factors database 216, to provide developers with a holistic, automated rating of the sensitivity of a section of code to a software project. In one example, while SCS 132 may independently track one or more characteristics of a section of code that may provide an indication of which sections of code are more actively changed, an indication of which sections of code are more activity changed does not automatically translate to an indication of the sensitivity of a section of code to cause a breaks. The holistic assessment by sensitivity service 130, based on an accumulation of multiple characteristics of sections of code, including the frequency that a section of code is changed, and weighted by multiple factors in sensitivity factors database 216, provides developers with a more reliable rating of the actual sensitivity of each section of code to a software project. For example, a git function of SCS 132 may track a number of times that a file has been changed and the number of lines of the file that are adjusted or removed. A developer may call the git function at SCS 132 to retrieve a git log of the number of times that a file has been changed and the number of lines of the file that are adjusted or removed. The git log may provide the developer with an indication of the file and line changes at the commit level, but if considered independent of the multiple characteristics accumulated in sensitivity metadata database 214 and the weighted factors in sensitivity factors database 216, the activity level on a file alone may not directly correlate to the sensitivity of a section of code to a software project. In another example, a characteristic indicating the size of a file may provide some indication of the importance of a file, however, files may also be split up during development, therefore if considered independent of the multiple characteristics accumulated in sensitivity metadata database 214 and the weighted factors in sensitivity factors database 216, the file size alone may not directly correlate to the sensitivity of a section of code to a software project.

In addition, advantageously, as illustrated, sensitivity service 130 may consistently automate the generation of a sensitivity rating for a section of code to provide a consistent sensitivity rating available to all developers, independent of the expertise of the developer with a section of code. In particular, independent of a sensitivity rating generated by sensitivity service 130, a developer may, through substantial trial and error and time, determine whether a file is sensitive based on the developer working with source code and learning, through experience working the files of the source code, which files are sensitive to change. A problem during development of a software project is that one developer's knowledge of which files are sensitive to change, gained from the developer's trial and error, is not easily transferrable to other developers. In addition, in particular, while developers may have access to log files that include one or more of the characteristics of a section of code, such as access to the git log file from SCS 132, different developers may have different levels of expertise with manually reviewing log files that indicate the tracked characteristics of sections of code to assess the importance of a section of code, and with different levels of expertise, may come to different conclusions about the importance of a file based on the information in the git file, such as the number of times a file is committed and the number of lines edited. In addition, even if software developer 110 accesses a log of sensitivity metadata database 214 within IDE 102, different developers, with different levels of expertise, may form different conclusions about the importance of a file based on the multiple characteristics accumulated in sensitivity metadata database 214. Furthermore, while developers may also manually tag a section of code with a particular tag or keyword designating a section of code as important, a tag or keyword based assessment of the importance of a file is also reliant upon each developer of a software project consistently assessing the importance of each file and consistently tagging important sections of code with specific tags or particular keywords, which may be problematic if multiple developers of different expertise work on a same software project and come to different conclusions about what sections of code need to be tagged as important sections of code.

In addition, advantageously, as illustrated, sensitivity service 130 may consistently automate the generation of a sensitivity rating for a section of code, independent of the functionality of any particular application source code. For example, during runtime of an application, CI system 134 may monitor the application and log the frequency of access and the duration of access by the application within each function of software build 140 to determine which portions of the source code are used most frequently. While in some applications the frequency and duration that an application accesses a particular function may correlate with the sensitivity of a section of code, in other applications, the frequency and duration characteristics gathered during runtime alone do not correlate to the sensitivity of sections of code. Sensitivity calculator 212 may consider the frequency and duration of application access to portions of source code during runtime as one of multiple characteristics, adjusted by weighted factors of sensitivity factors database 216, to determine a sensitivity rating.

Figure 3:
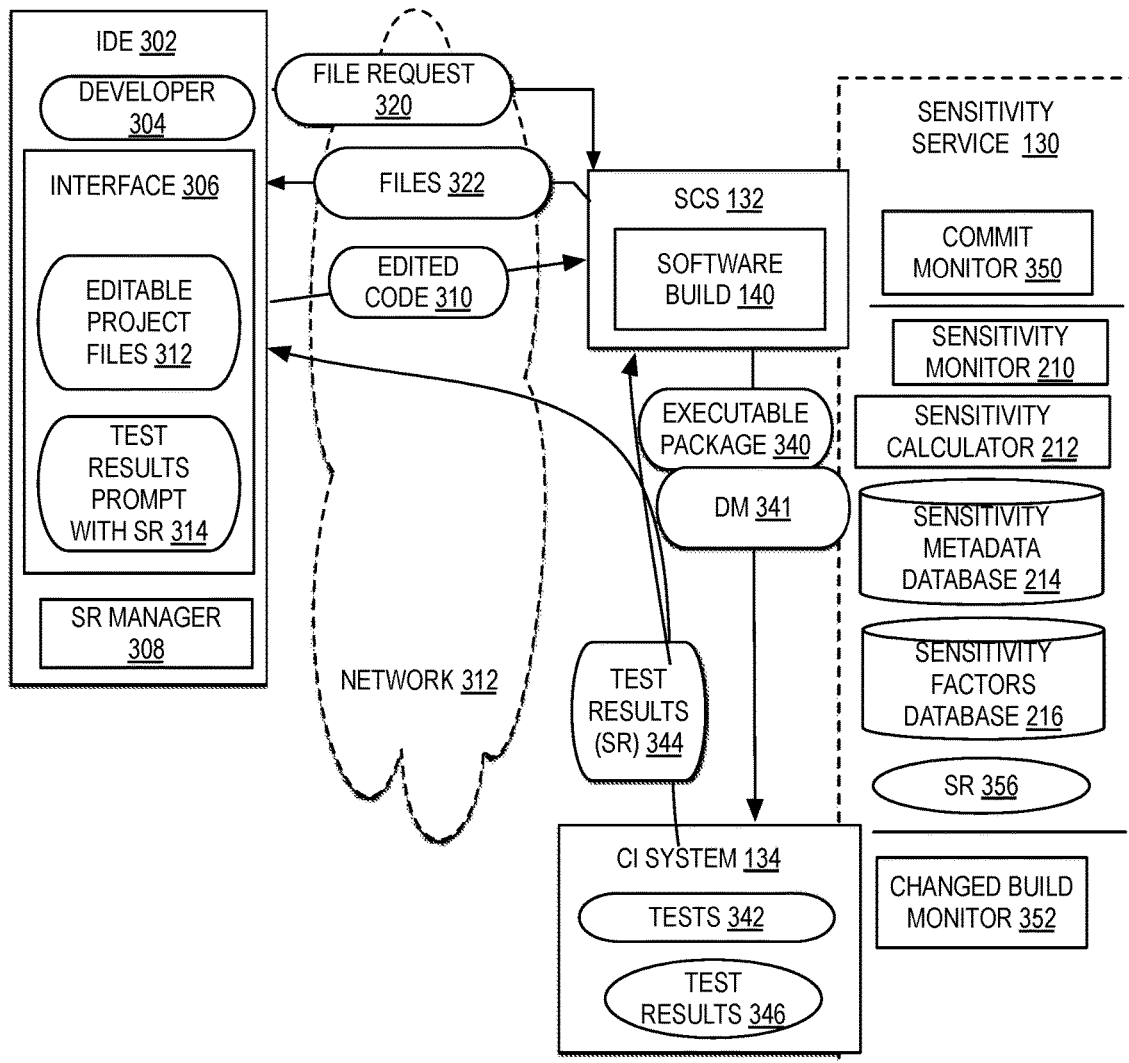
FIG. 3 illustrates one example of a block diagram of a software project development model for tracking a code sensitivity during software project development and returning test results with sensitivity ratings to a developer.

FIG. 3 is a block diagram illustrating one example of a software project development model for tracking a code sensitivity during software project development and returning test results with sensitivity ratings to a developer.

In one example, a developer 304 working within an IDE 302, may request to open one or more files, which are part of software build 140, within an interface 306 of IDE 302. In one example, interface 306 may represent a graphical user interface (GUI). In another example, interface 306 may represent other types of output interfaces.

For example, an authorized developer 304 may send a file request 320 to SCS 132 for one or more files of software build 140 and receive, in response, files 322. In one example, SCS 132 may manage a repository for code for software build 140 during the development of the software project. In one example, SCS 132 may simultaneously manage additional software builds and may manage requests from multiple authorized developers to access files from one or more software builds.

Within interface 306, developer 304 may be authorized to edit code within one or more opened files 322, as editable project files 312. In addition, developer 304 may select, within interface 306, to push the edited files within interface 306 back to SCS 132 as edited code 310, via a network 312.

In one example, in response to SCS 132 committing edited code 310 to software build 140, SCS 132 may call CI system 134 with a executable package 340, incorporating edited code 310 into software build 140. In addition, SCS 132 may send DM 341, which includes a developer ID and other developer metadata for edited code 310, separately, or integrated within executable package 340. In one example, CI system 134 receives executable package 340 and runs tests 342 on executable package 340. In one example, tests 342 may include one or more types of tests such as unit tests, which sequentially test the input/output (I/O) for each test. In one example, if the actual I/O for each of tests 342 matches the expected I/O for each of tests 342, then CI system 134 may return an indicator that the software build 140 has succeeded. In addition, CI system 134 may run tests 342 to check the functionality of software build 140, including testing whether the functionality is valid, works, and works within the whole project. In one example, CI system 134 may return the result of the test to IDE 302 and to SCS 132, as test results 346, indicating a failure, or indicating valid, works, or works within the whole project. IDE 302 may provide an alert with test results 346 within interface 306.

In the example, sensitivity service 130 may be integrated through one or more of SCS 132 and CI system 134 through one or more of plugins, modules, or other components. In one example, sensitivity metadata may be collected and a SR 356 generated by sensitivity service 130 at one or more of the SCS level and the CI system level. In one example, sensitivity monitor 210 may interface with one or more functions of SCS 132 and CI system 134 that provide logs of tracked characteristics of edited code 310 and testing of software build 140. In addition, sensitivity monitor 210 may implement functions that independently track characteristics of edited code 310 and testing of software build 140 at SCS 132 and CI system 134.

In one example, for sensitivity service 130 to collect metadata at the SCS level, advantageously, sensitivity service 130 may integrate a commit monitor 350 of sensitivity service 130 at SCS 132 to monitor activity at SCS 132. In one example, if commit monitor 350 detects test results 346 returned from CI system 134, with a failed test indicator, commit monitor 350 may trigger sensitivity monitor 210 to collect sensitivity characteristics of the committed code and to update sensitivity metadata database 214.

In one example, for sensitivity service 130 to collect metadata at the CI system level, advantageously, sensitivity service 130 may integrate changed build monitor 352 of sensitivity service 130 at CI system 134 to monitor activity at CI system 134. In one example, if changed build monitor 352 detects executable package 340 received from SCS 132, changed build monitor 352 will trigger sensitivity monitor 210 to store a reference to the identifier for developer 304 and to the code changes received in edited code 310, from DM 341, within sensitivity metadata database 214. Next, in one example, if changed build monitor 352 detects a failed test in test results 346, changed build monitor 352 may trigger sensitivity monitor 210 to update sensitivity metadata database 214 with test results 346 and other characteristics and may trigger sensitivity calculator 212 to generate an updated SR 356 for the section of code within edited code 310. In one example, advantageously, changed build monitor 352 provides SR 356 to CI system 134 to integrate SR 356 into test results 346 as test results (SR) 344 returned to IDE 302.

In one example, according to an advantage of one or more embodiments of the present invention, IDE 302 may integrate an SR manager 308 that identifies SR metadata returned with test results (SR) 344. In one example, SR manager 308 may select an output format for test results (SR) 344 based on a set of preferences. In the example, within interface 306, if the test results indicate a failure, SR manager 308 may specify the test results prompt within interface 306 to include an indicator of the SR within an alert message, such as by outputting a separate test results prompt with SR 314. For example, SR manager 308 may translate the SR into a numerical output format within test results prompt with SR 314, where different numbers are assigned to different ranges of SRs. In another example, SR manager 308 may translate the SR into a graphical color output within test results prompt with SR 314, where different graphical colors are assigned to different ranges of SRs. For example, SR manager 308 may select a graphical output of the log of data output within test results (SR) 344. In addition, or alternatively, SR manager 308 may integrate the SR received in test results (SR) 344 as annotations to sections of code displayed within editable project files 312.

In one example, SR 356 may represent a single sensitivity rating for a single section of code or may represent multiple sensitivity ratings, each assigned to a separate section of code or separate file within edited code 310. In one example, SR 356 may represent a numerical or textual rating indicator and may also include additional information about the change requested in edited code 310 and if the edited code caused a testing failure, additional information collected about why the test failed.

Figure 4:
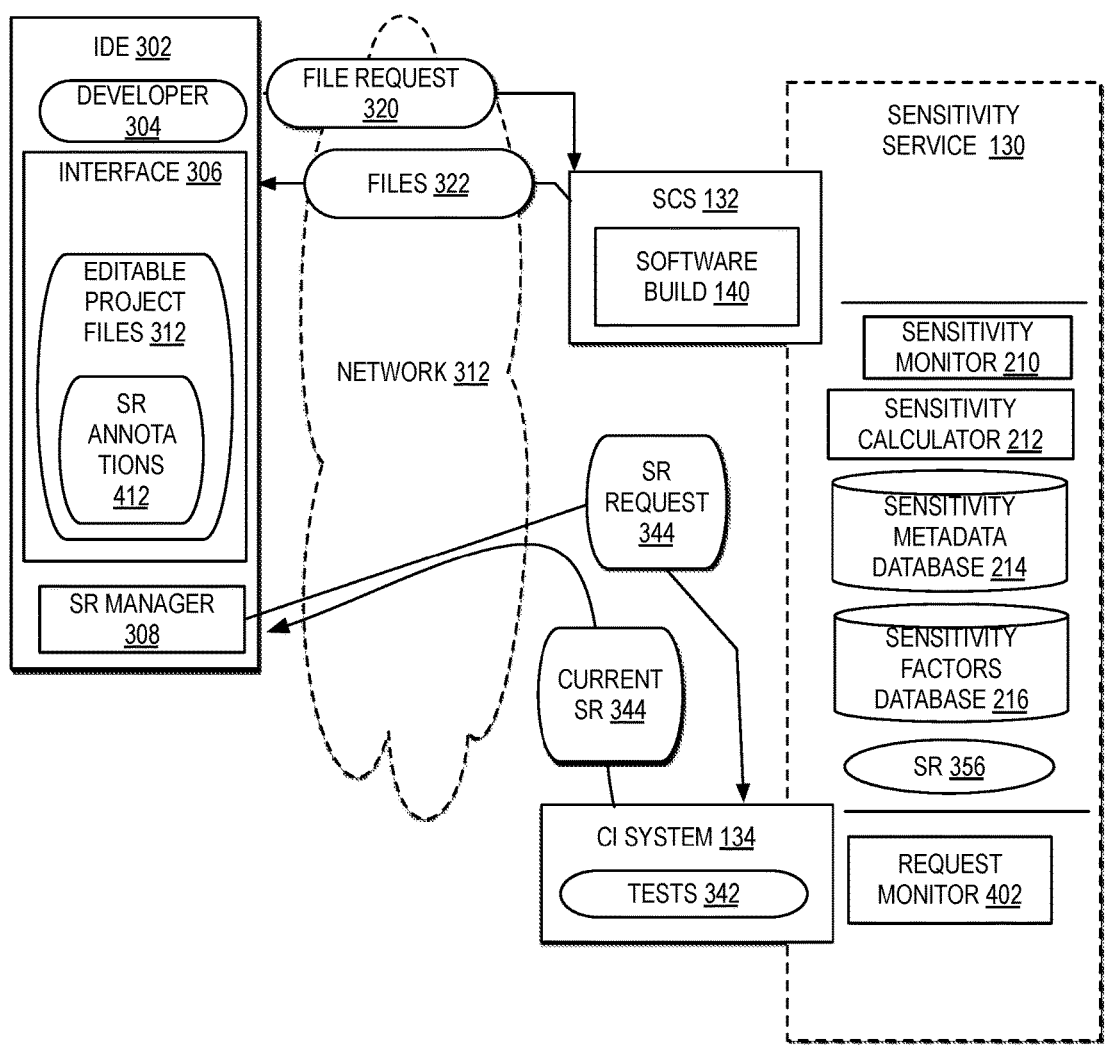
FIG. 4 illustrates one example of a block diagram of a software project development model for providing code sensitivity ratings within editable project files during software project development.

FIG. 4 is a block diagram illustrating one example of a software project development model for providing code sensitivity ratings within editable project files during software project development.

In one example, as described in FIG. 3, developer 304 working within IDE 302, may request to open one or more files that are part of software build 140 within interface 306 of IDE 302 by sending a file request 320 to SCS 132 for one or more files of software build 140 and receiving, in response, files 322. Within interface 306, developer 304 may be authorized to edit code within one or more opened files 322, as editable project files 312.

In one example, according to an advantage of one or more embodiments of the present invention, SR manager 308 of IDE 302 may be set to detect when developer 304 sends file request 320 and, in response to detecting developer 304 send file request 320, SR manager 308 may send an SR request 344 to CI system 134 with a request for the SR for the requested files. In one example, a request monitor 402 of sensitivity service 130 integrated with CI system 134 receives SR request 344. Request monitor 402 may search sensitivity metadata database 214 for sensitivity rating calculation history 244 and return the previously generated SR 356 as current SR 344. In addition, request monitor 402 may trigger sensitivity calculator 212 to first generate or update the SR of the files in SR request 344 and then send the generated or updated SR 356 as current SR 344. In one example, in addition to or alternatively to querying CI system 134 with SR request 344, SR manager 308 may query SCS 132 with SR request 344, and SCS 132 may integrate request monitor 402 for handling SR requests.

In one example, advantageously, SR manager 308 may receive current SR 344 and update editable project files 312 with the SR assigned to each section of code as SR annotations 412. In one example, SR annotations 412 displayed within sections of code of editable project files 312 provide developer 304 with the risk level of breakages or other defects associated with each section of code. In one example, if another developer, in another IDE made the file request and received the same files 322, that developer may also request the SR for files 322 and view the same SR annotations within the editable project files within another GUI interface of another IDE. According to an advantage of one or more embodiments of the present invention, by providing developers with SR annotations within the editable project files, each developer is provided with the same information regarding the potential sensitivity of each section of code to breakage, regardless of when the developer joined a project or the developer's level of expertise with coding or with the project.

In one example, advantageously, in response to SR manager 308 receiving current SR 344, while developer 304 is working within editable project files 312, SR manager 308 may be set to periodically query CI system 134 or SCS 132 with additional SR requests, to receive updated SR information while a developer is working on files. In another example, in response to CI system 134 or SCS 132 receiving SR request 344, request monitor 402 may be set to periodically update SR 356 for the requested files and automatically push SR updates to SR manager 308 until SR manager 308 sends an indicator that files 322 are no longer open or SCS 132 detects that developer 304 has closed files 322.

Figure 5:
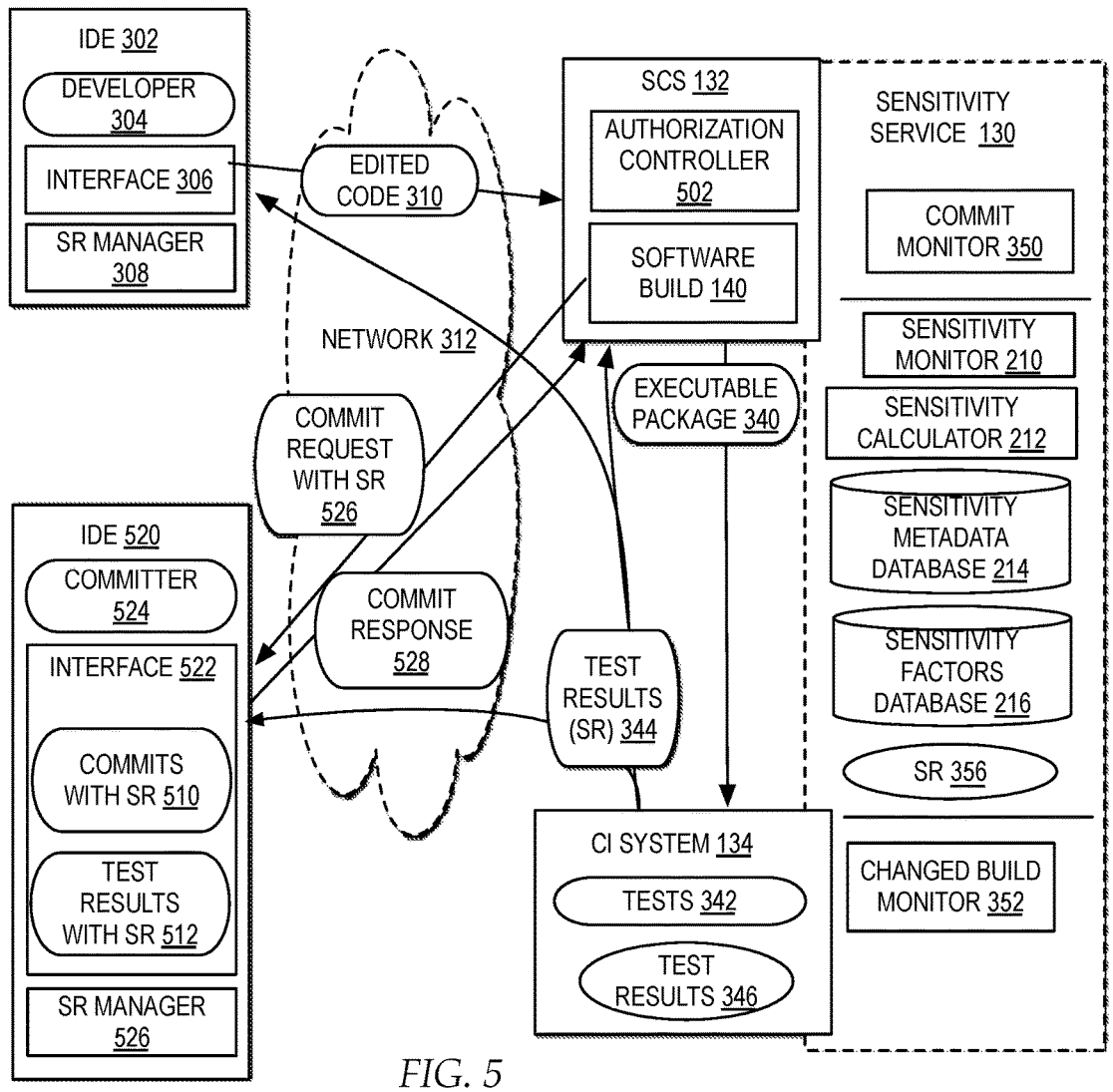
FIG. 5 illustrates one example of a block diagram of a software project development model for providing code sensitivity ratings to a code committer during product development.

FIG. 5 is a block diagram illustrating one example of a software project development model for providing code sensitivity ratings to a code committer during product development.

In one example, SCS 132 may include an authorization controller 502 that manages authentication of developers prior to allowing a developer to edit or access software build 140 and may restrict how each developer may edit or access software build 140. In one example, authorization controller 502 may require a secured connection via network 312 for developer 304 to pass edited code 310 to SCS 132 by requiring developer 304 to authenticate as an authorized code author.

In addition, prior to committing edited code 310 to software build 140, authorization controller 502 may require authorization to commit the code by an authorized committer. SCS 132 may receive edited code pushed to commit to software build 140 from developers who are authorized to author code, but require an additional authorization from an authorized committer, prior to committing the code to software build 140. In one example, if developer 304 is authorized as both an author and a committer, authorization controller 502 may allow developer 304 to both push edited code 310 and authorize the commit of edited code 310 to software build 140 as managed by SCS 132. In another example, if developer 304 is authorized as an author, but not as a committer, in response to receiving edited code 310 at SCS 132, authorization controller 502 may send a commit request 526 to a committer 524 within an IDE 520 with a request to authorize a commit of edited code 310 to software build 140. Committer 524 may view commit request 526 within an interface 522 of IDE 520 and return a commit response 528 indicating whether edited code 310 is authorized to be committed to software build 140.

In one example, IDE 520, accessed by committer 524, may represent an instance of the one or more development applications supporting IDE 302. In another example, IDE 520 may represent an instance of one or more other types of applications that are different from the one or more development applications supporting IDE 302. For example, IDE 520 may be integrated within a project management application for committer 524, where committer 524 is a manager who has authority to commit for multiple software builds and commit requests are pushed to the manager in the project management application interface. In another example, committer 524 may represent another developer who is only authorized to review and commit code to software build 140.

In one example, advantageously, commit monitor 350 of sensitivity service 130 may monitor SCS 132 for activity indicating that a commit request will be sent to a committer for edited code 310. In one example, commit monitor 130 may trigger sensitivity calculator 212 to access SR 356 for each section of code within edited code 310. In accessing SR 356 for each section of code within edited code 310, commit monitor 130 may also update SR 356 with a developer assessment for the developer ID of the author of the edited code. In one example, authorization controller 502 may integrate SR 356, updated with the developer assessment, into commit request with SR 526, to provide the potential SR for edited code 310 with the commit request. In one example, an SR manager 526 integrated in IDE 520 may detect commit request with SR 526 and output commit request with SR 526 within a portion of interface 522 that includes a selection of multiple pending commit requests, illustrated as commits with SR 510, with the SR for each pending and approved commit request displayed. For example, commits with SR 510 may include a list of commit requests that need to be approved along with the SR for each commit request, providing an interface in which committer 524 may efficiently select to approve, review or deny a commit request. In one example, commits with SR 510 may graphically distinguish commit requests with higher SR ratings from commit requests with lower SR ratings to automatically prioritize the commit requests that may require additional review by committer 524. If the commit request includes a high SR, committer 324 may be directed to apply additional scrutiny prior to authorizing the commit of edited code 310 to software build 140.

In another example, advantageously, authorization controller 502 may select, based on the level of SR for a commit request, which committer, from among multiple committers registered for software build 140, to send the commit request. For example, committer 524 may be specified for receiving low level SR commit requests, which may be the majority of commit requests, however, another committer may be specified for receiving high level SR commit requests, which may require additional skill or expertise to review than the low level SR commit requests.

In one example, as described in FIG. 3, once edited code 310 is committed to software build 140, then executable package 340 is sent to CI system 134, which runs tests 342 and produces test results 346. In one example, a changed build monitor 352 may generate SR 356 to return with test results 346 for executable package 340. As illustrated in FIG. 5, in addition to returning tests results 346 and SR 356 as test results (SR) 344 to IDE 302 and SCS 132, CI system 134 may also return test results to committer 524 in IDE 520. In particular, in one example, executable package 340 may identify a committer ID for committer 524, which sensitivity monitor 210 detects and adds to sensitivity metadata database 214 for executable package 340. SR 356 may include the committer ID in the SR metadata. CI system 134 may direct test results (SR) 344 to committer 524 according to the committer ID in the SR metadata. In one example, SR manager 526 may detect test results (SR) 344 and update a test results with SR 512 output within interface 522. In one example, advantageously, test results with SR 512 may display one or more test results generated from edited code committed by committer 524, such that committer 524 may receive visual indicators of the SR assigned to committed code after a test. In one example, advantageously, SR manager 526 may also monitor and compare the difference between the SR received with a commit request for a section of code and the SR received with test results for the section of code, and provide an output in test results with SR 512 that indicates the difference between the previous SR for an edited section of code prior to commit and the updated SR after testing the edited code, post-commit. In one example, advantageously, SR manager 526 may filter which test results to output within test results with SR 512 by selecting which types of SR results to output or selecting which types of SR results to output as alerts. For example, SR manager 526 may select that if a same section of code has caused a break in software build 140 more than a threshold number of times or the SR level returned in test results (SR) 344 is more than a threshold level, SR manager 526 may trigger a type of output within test results with SR 512 that may alert committer 524 that additional attention is required for the section of code prior to authorizing a next commit for the section of code.

Figure 6:
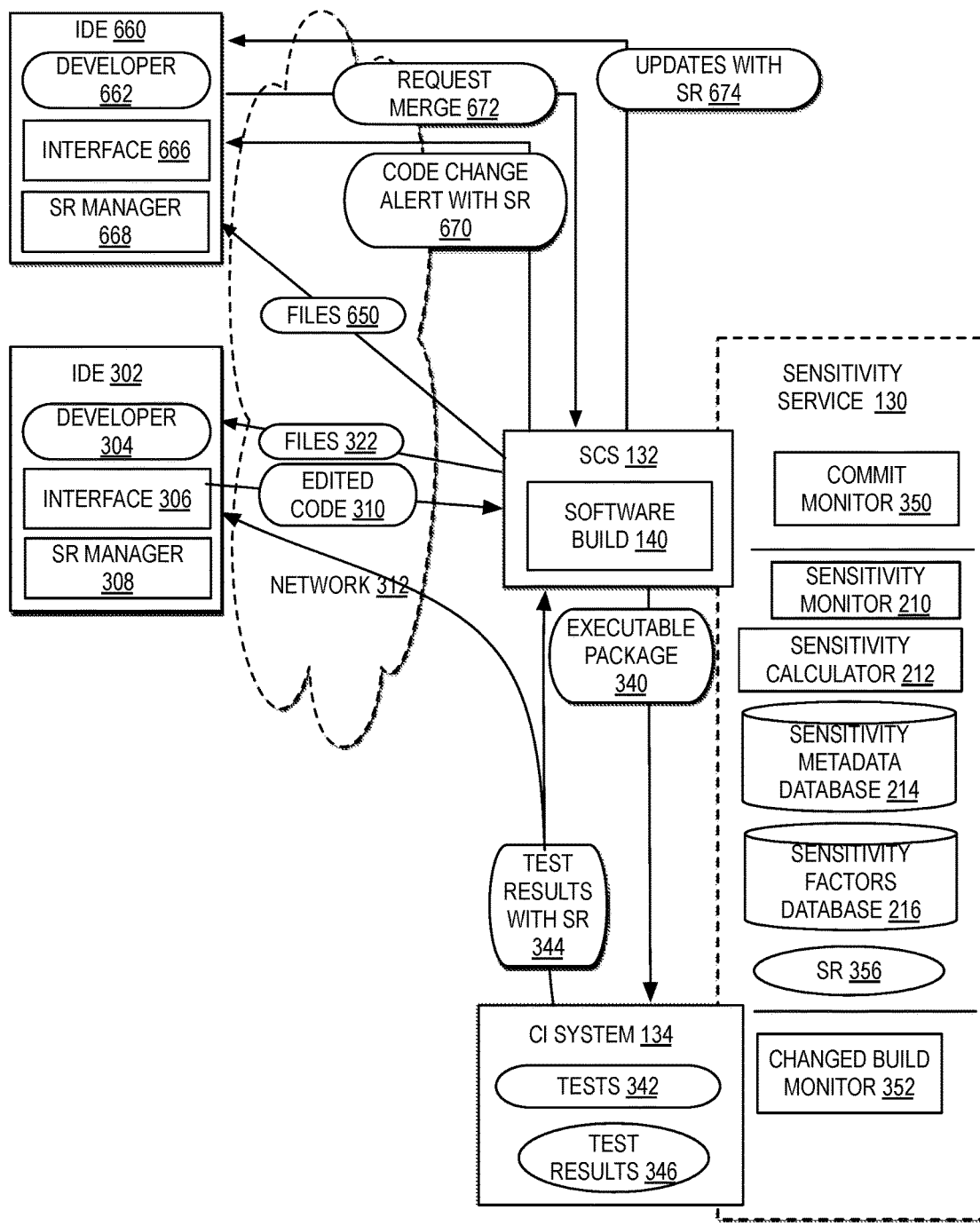
FIG. 6 illustrates one example of a block diagram of a software project development model for providing code sensitivity ratings to multiple developers during merger management.

FIG. 6 is a block diagram illustrating one example of a software project development model for providing code sensitivity ratings to multiple developers during merger management.

In one example, developer 662 may request access, from SCS 132 via network 312, to software build 140 via an interface 666 of an IDE 660, and receive files 650 from SCS 132. In one example, developer 304 and a developer 662 may receive, from SCS 132, access to open a same file within files 322 and files 650. In one example, developer 304 and developer 662 may concurrently edit the same file while it is open at IDE 302 and IDE 660, but may perform different edits of the same open file. As described in FIG. 4, each of SR manager 308 and SR manager 668 may also request the SR for files 322 and files 650 from CI system 134 or SCS 132, and each of SR manager 308 and SR manager 668 may annotate files 322 and files 650 with the received SR for the code within interface 306 and interface 666. In addition or alternatively, SCS 132 may return files 322 and files 650 to IDE 302 and IDE 660 with the SR accessed for the files from sensitivity service 130.

In one example, SCS 132 may manage mergers of the edits to a same file by different developers at one or more times. In one example, developer 304 may send edited code 310 to SCS 132 with a request to commit the code to software build 140. In one example, advantageously, commit monitor 350 may trigger sensitivity calculator 212 to generate SR 356 for edited code 310 and send a code change alert with SR 670 to IDE 660. In one example, SR manager 668 may detect code change alert with SR 670 and update interface 666 with an option for developer 662 to select to merge the changes made to the file in edited code 310 with the changes developer 662 is making to the file in interface 666. In one example, if developer 662 selects to merge the changes made to the file in edited code 310 with the changes to edited code 310, IDE 660 may send request merge 672, with the edited code from developer 662, to SCS 132. By providing developer 662 with the SR of edited code 310 prior to completing the commit of edited code 310 to software build 140, developer 662 may determine whether edited code 310 is likely to break the build, and may decide whether to merge edits made by developer 662 that may reduce the likelihood that the build will break. In one example, if developer 662 sends request merge 672, SCS 132 may manage the merger of the code within request merge 672 with edited code 310 and send updates with SR 674 providing the merged file. In one example, if developer 662 sends request merge 672, SCS 132 may also send a confirmation to developer 304 that developer 304 approves of merging the edited code from developer 662 with edited code 310 prior to testing the build with the edited code.

In one example, commit monitor 350 may additionally or alternatively trigger sensitivity calculator 212 to generate SR 356 for edited code 310 after testing of executable package 340 by CI system 134. In one example, after SCS 132 receives test results with SR 344, if SCS 132 detects that multiple developers have the same file open that was committed into software build 140 and tested, SCS 132 may send code change alert with SR 670, indicating what code has been changed, the results of the test, and the SR returned with the test results.

Figure 7:
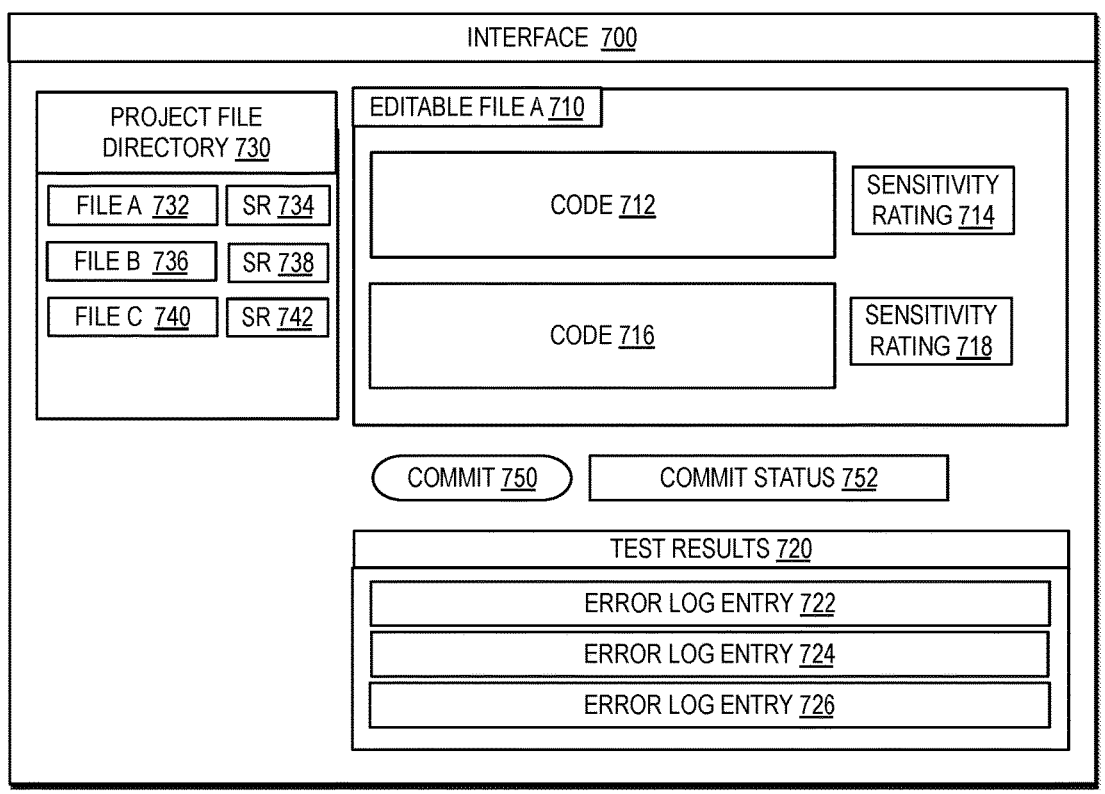
FIG. 7 illustrates one example of a block diagram of an interface including editable project files illustrated with test results and sensitivity ratings.

FIG. 7 is a block diagram illustrating one example of an interface including editable project files illustrated with test results and sensitivity ratings.

In one example, an interface 700 may represent an interface within an IDE, such as interface 306 within IDE 302. In one example, interface 700 may include a selection of files of a project that a user may select from, illustrated as project file directory 730. In one example, project file directory 730 includes a "file A" 732, a "file B" 736, and a "file C" 740. Each of "file A" 732, "file B" 736, and "file C" 740 are selectable files that a user may select to request to open within interface 700. In one example, when a user selects to open a project, SCS 132 may provide selectable options of file names included in the project for display in project file directory 730, for selection by a user. In one example, SCS 132 or CI 134 may also deliver, with selectable project file names, a current SR rating for each of the files. In one example, the current SR rating received for each of the files of a project may be displayed within project file directory 730. For example, "file A" 732 is displayed with an SR 734, "file B" 736 is displayed with an SR 738, and "file C" 740 is displayed with an SR 742. An IDE, such as IDE 302, may receive updated SRs for files, from SCS 132 or CI system 134, and update the SR displayed for a file within interface 700 with an updated SR.

In one example, a user may select to open and edit one or more of the files displayed in project file directory 730, within interface 700. For example, in response to a user selecting to edit "file A" 732, an IDE may request the code for "file A" from SCS 132, and the returned code for "file A" from SCS 132 may be output in interface 700, as editable file A 710. In one example, editable file A 710 may include multiple portions of code, illustrated in the example as code 712 and code 716. In addition, editable file A 710 may include one or more tools for editing code 712 and code 716, along with adding additional code to editable file A 710. For example, interface 700 may include selectable options for selecting tools to import modules, create classes, create interfaces, change a section of code from one module to another module, create a new module or create a new parameter, add a type of parameter, rename a parameter, and other commands, in addition to tools that allow a user to edit lines of code by typing additional or alternate code elements. In additional or alternate embodiments, an editable file may include additional or alternate selections of code.

In one example, interface 700 may display, with each of the code sections in editable file A 710, one or more sensitivity ratings received from one or both of SCS 132 and CI 134 for editable file A 710. In one example, editable file A 710 includes a sensitivity rating 714 illustrated with code 712 and a sensitivity rating 718 illustrated with code 716. In one example, sensitivity rating 714 and sensitivity rating 718 may each be displayed by one or more of a numerical rating and a graphical representation of a rating, such as a color or graphic associated with a rating value. In additional or alternate embodiments, sensitivity rating 714 and sensitivity rating 718 may be illustrated as graphical elements incorporated into code 712 and code 716, respectively, or as separate elements.

In one example, a user editing editable file A 710 may select a selectable option to commit editable file A 710 to a software build. In one example, interface 700 may include a selectable option of commit 750 for a user to select to commit the edited code within editable file A 710 to software build 140. In response to a user selection of commit 750, IDE 302 may send the edited code within editable file A 710 to SCS 132.

In one example, interface 700 may also include a display of test results with SRs received from one or more of SCS 132 and CI system 134. In one example, test results 720 may include one or more error entries, for one or more types of errors, illustrated as an error log entry 722, an error log entry 724, and an error log entry 726. In one example, in response to a user selecting each of error log entry 722, error log entry 724, or error log entry 726, one or more portions of code 712 and code 716 identified by the selected errors, may be graphically highlighted. In one example, tests results 720 may include one or more types of errors including, but not limited to, a failure and a problem.

Figure 8:
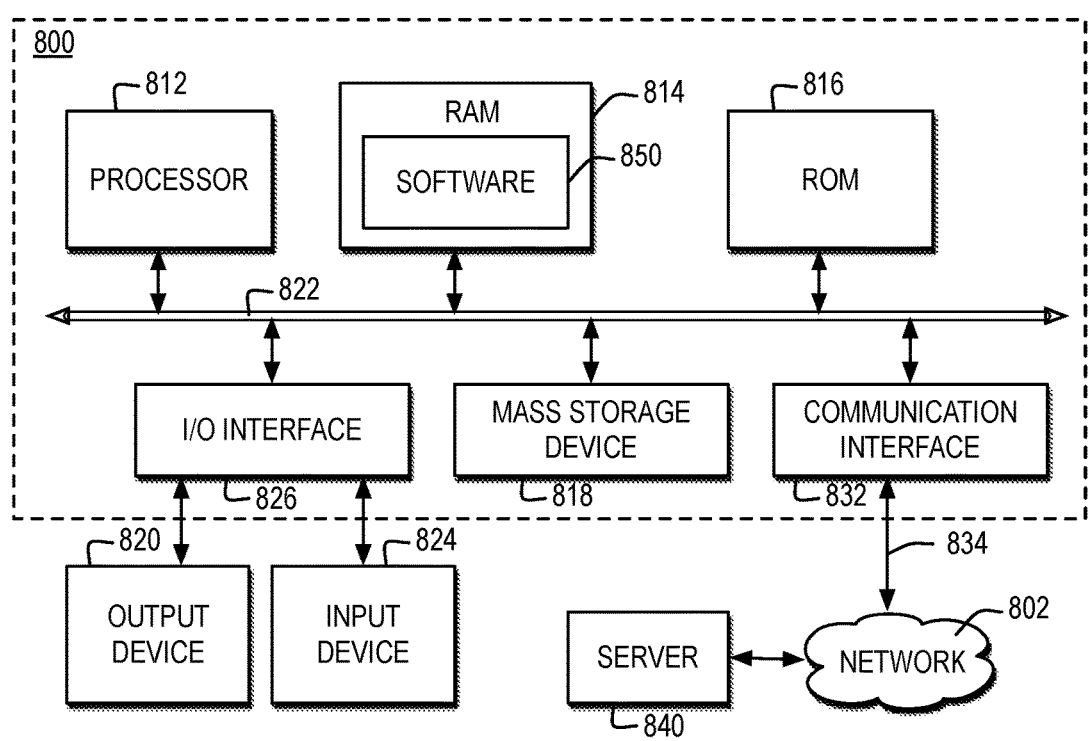
FIG. 8 illustrates one example of a block diagram of a computer system in which one embodiment of the invention may be implemented.

FIG. 8 illustrates a block diagram of one example of a computer system in which one embodiment of the invention may be implemented. The one or more embodiments of the present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

In one embodiment, the operations performed by processor 812 may control the operations of flowcharts of FIGS. 9-19 and other operations described herein. Operations performed by processor 812 may be requested by software 850 or other code or the steps of one or more embodiments of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts in FIGS. 9-19.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In one or more alternate embodiments of the invention, additional or alternate input and output peripheral components may be added.

With respect to FIG. 8, the one or more embodiments of the invention may be a system, a method, and/or a computer program product. The computer program product may include a computer readable storage medium (or media) having computer readable program instructions thereon for causing a processor to carry out aspects of the one or more embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software project, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more embodiments of the invention.

Aspects of one or more embodiments of the invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to one or more various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to one or more embodiments of the invention.

Figures 9, 10:
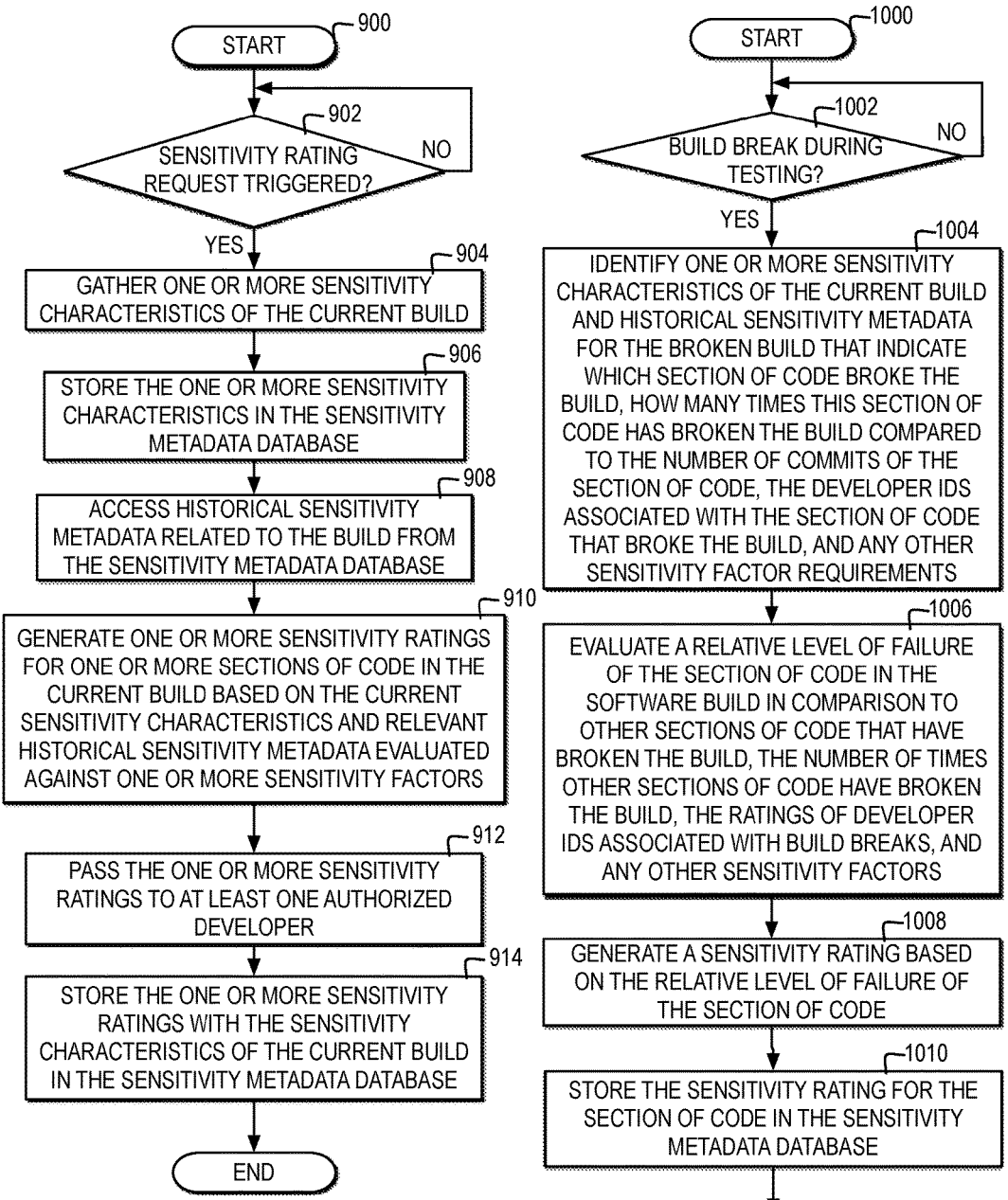
FIG. 9 illustrates one example of a high level logic flowchart of a process and computer program for generating a sensitivity rating for a section of code within a software build when a sensitivity rating is triggered.
FIG. 10 illustrates one example of a high level logic flowchart of a process and computer program for generating a sensitivity rating for a committed section of code in response to a build break caused by the committed section of code.

FIG. 9 illustrates a high level logic flowchart of a process and computer program for generating a sensitivity rating for a section of code within a software build when a sensitivity rating is triggered.

In one example, the process and program starts at block 900 and thereafter proceeds to block 902. Block 902 illustrates a determination whether a sensitivity rating request is triggered. At block 902, if a sensitivity rating request is triggered, then the process passes to block 904. Block 904 illustrates gathering one or more sensitivity characteristics of the current build. Next, block 906 illustrates storing the one or more sensitivity characteristics in the sensitivity metadata database. Thereafter, block 908 illustrates accessing historical sensitivity metadata related to the build from the sensitivity metadata database. Next, block 910 illustrates generating one or more sensitivity ratings for one or more sections of code in the current build based on the current sensitivity characteristics and relevant historical sensitivity metadata evaluated against one or more sensitivity factors. Thereafter, block 912 illustrates passing the one or more sensitivity ratings to at least one authorized developer. Next, block 914 illustrates storing the one or more sensitivity ratings with the sensitivity characteristics of the current build in the sensitivity metadata database, and the process ends.

FIG. 10 illustrates a high level logic flowchart of a process and computer program for generating a sensitivity rating for a committed section of code in response to a build break caused by the committed section of code.

In one example, the process and program starts at block 1000 and thereafter proceeds to block 1002. Block 1002 illustrates a determination whether a build breaks during testing. At block 1002, if a build breaks during testing, then the process passes to block 1004. Block 1004 illustrates identifying one or more sensitivity characteristics of the current build and historical sensitivity metadata for the broken build that indicate which section of code broke the build, how many times this section of code has broken the build compared to the number of commits of the section of code, the developer IDs associated with the section of code that broke the build, and any additional sensitivity factor requirements. Next, block 1006 illustrates evaluating a relative level of failure of the section of code in the software build in comparison to other sections of code that have broken the build, the number of times other sections of code have broken the build, the ratings of developer IDs associated with build breaks, and any other sensitivity factors. Thereafter, block 1008 illustrates generating a sensitivity rating based on the relative level of failure of the section of code. Block 1010 illustrates storing the sensitivity rating for the section of code in the sensitivity metadata database, and the process ends.

Figure 11:
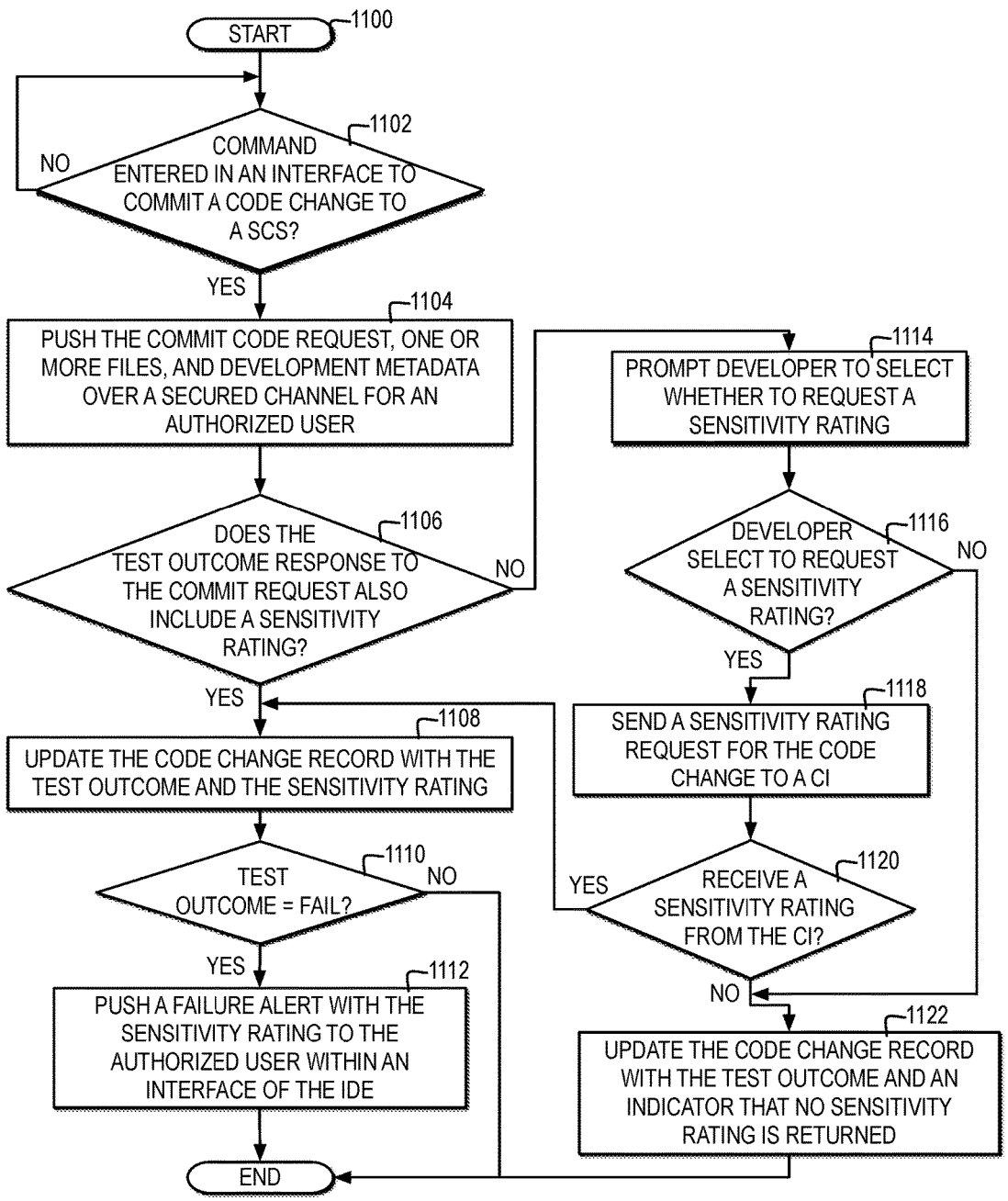
FIG. 11 illustrates one example of a high level logic flowchart of a process and computer program for receiving and outputting sensitivity ratings with code change commit test results in an IDE.

FIG. 11 illustrates a high level logic flowchart of a process and program for receiving and outputting sensitivity ratings with code change commit test results in an IDE.

In one example, the process and program starts at block 1100 and thereafter proceeds to block 1102. Block 1102 illustrates a determination whether a command is entered in an interface of an IDE to commit a code change to an SCS. At block 1102, if a command is entered in an interface of an IDE to commit a code change to an SCS, then the process passes to block 1104. Block 1104 illustrates pushing the commit code request, one or more files with edited code, and development metadata over a secured channel for an authorized user to SCS. Next, block 1106 illustrates a determination whether the test outcome response to the commit request received by the IDE also includes a sensitivity rating. At block 1106, if the test outcome response includes a sensitivity rating, then the process passes to block 1108. Block 1108 illustrates updating a code change record with the test outcome and the sensitivity rating. In one example, a code change record may be maintained by IDE for tracking the status of a code change in a section of code committed to a software build by the developer and may also be output within an interface of the IDE. Next, block 1110 illustrates a determination whether the test outcome indicates the test failed. At block 1110, if the test outcome does not indicate the test failed, then the process ends. At block 1110, if the test outcome does indicate the test failed, then the process passes to block 1112. Block 1112 illustrates pushing a failure alert with the sensitivity rating to the authorized user within an interface of the IDE, and the process ends.

Returning to block 1106, if the test outcome response does not include a sensitivity rating, then the process passes to block 1114. Block 1114 illustrates prompting the developer to select whether to request a sensitivity rating. Next, block 1116 illustrates a determination whether the developer selects to request a sensitivity rating. At block 1116, if the developer does not select to request a sensitivity rating, then the process passes to block 1122. Block 1122 illustrates updating the code change record with the test outcome and an indicator that no sensitivity rating is returned, and the process ends.

Returning to block 1116, if the developer selects to request a sensitivity rating, then the process passes to block 1118. Block 1118 illustrates sending a sensitivity rating request for the code change to a CI. Next, block 1120 illustrates a determination whether a sensitivity rating is received from the CI. At block 1120, if a sensitivity rating is received from the CI, then the process passes to block 1108. At block 1120, if a sensitivity rating is not received from the CI, then the process passes to block 1122.

FIG. 12 illustrates a high level logic flowchart of a process and program for managing a sensitivity service at an SCS level in response to committing code changes to a software build.

In one example, the process and program starts at block 1200 and thereafter proceeds to block 1202. Block 1202 illustrates a determination whether a code change request is received from an authorized author and committer from one or more IDEs. At block 1202, if a code change request is received from an authorized author and committer, then the process passes to block 1204. Block 1204 illustrates compiling the software build into an executable package incorporating the changed code. Next, block 1206 illustrates notifying the CI that a change has been made to the code with the updated executable package and development metadata, such as the author ID and committer ID. Thereafter, block 1208 illustrates a determination whether a sensitivity service is set for the SCS level. At block 1208, if a sensitivity service is not set for the SCS level, then the process ends. At block 1208, if a sensitivity service is set for the SCS level, then the process passes to block 1210. Block 1210 illustrates a determination whether the SCS receives test results from the CI indicating the test failed. At block 1210, if the SCS does not receive tests results from the CI indicating the test failed, then the process ends.

Returning to block 1210, if the SCS does receive tests results from the CI indicating the test failed, then the process passes to block 1212. Block 1212 illustrates triggering the sensitivity service to monitor sensitivity characteristics and generate a sensitivity rating for the changed sections of code. Next, block 1214 illustrates pushing the sensitivity rating to the authorized author and committer at the one or more IDEs, and the process ends.

FIG. 13 illustrates a high level logic flowchart of a process and program for managing a sensitivity service at a CI level in response to receiving a code change notice for software build.

In one example, the process and program start at block 1300 and thereafter proceed to block 1302. Block 1302 illustrates a determination whether a CI receives a notification of a code change to a software build with an executable package and development metadata. At block 1302, if CI receives a notification of a code change to a software build with an executable package and development metadata, then the process passes to block 1304. Block 1304 illustrates a determination whether a sensitivity service is set for the CI level.

At block 1304, if a sensitivity service is set for the CI level, then the process passes to block 1306. Block 1306 illustrates storing a reference to the sections of code that changed from the notification and the developer ID from the development metadata in the sensitivity metadata database. Next, block 1308 illustrates testing the executable package with the changed code. Thereafter, block 1310 illustrates triggering the sensitivity service to monitor sensitivity characteristics and generate a sensitivity rating for the changed sections of code with the test results. Next, block 1312 illustrates pushing the test results and sensitivity rating to the developer IDE associated with the developer ID, and the process ends.

Returning to block 1304, if a sensitivity service is not set for the CI level, then the process passes to block 1314. Block 1314 illustrates testing the executable package with the changed code. Next, block 1316 illustrates returning the results to the SCS. Thereafter, block 1318 illustrates pushing the test results to the developer IDE associated with the developer ID in the development metadata, and the process ends.

Figure 14:
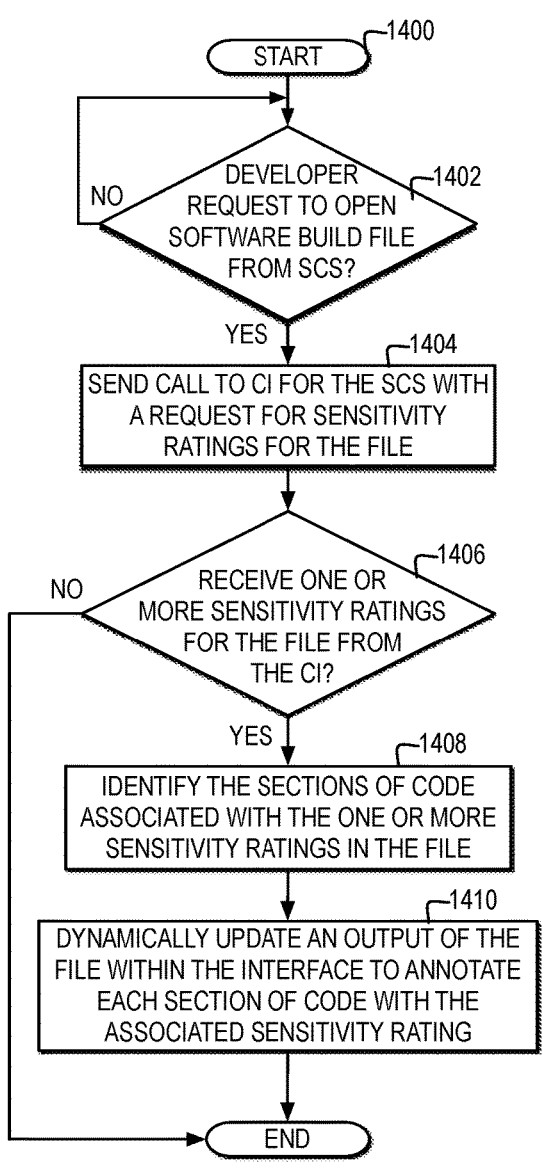
FIG. 14 illustrates one example of a high level logic flowchart of a process and computer program for managing access to sensitivity ratings for sections of code in response to calls by a developer to open files from a software build.

FIG. 14 illustrates a high level logic flowchart of a process and program for managing access to sensitivity ratings for sections of code in response to calls by a developer to open files from a software build.

In one example, the process and program start at block 1400 and thereafter proceed to block 1402. Block 1402 illustrates a determination whether a developer request to open a software build file from the SCS is received within an IDE. At block 1402, if a developer requests to open a software build file from the SCS is received within an IDE, then the process passes to block 1404.

Block 1404 illustrates sending a call to the CI for the SCS with a request for sensitivity ratings for the requested file. Next, block 1406 illustrates a determination whether one or more sensitivity ratings are received for the file from the CI. At block 1406, if one or more sensitivity ratings are not received for the file from the CI, then the process ends. At block 1406, if one or more sensitivity ratings are received for the file from the CI, then the process passes to block 1408.

Block 1408 illustrates identifying the sections of code associated with the one or more sensitivity ratings in the file. Next, block 1410 illustrates dynamically updating an output of the file within an interface to annotate each section of code with the associated sensitivity rating, and the process ends.

Figure 15:
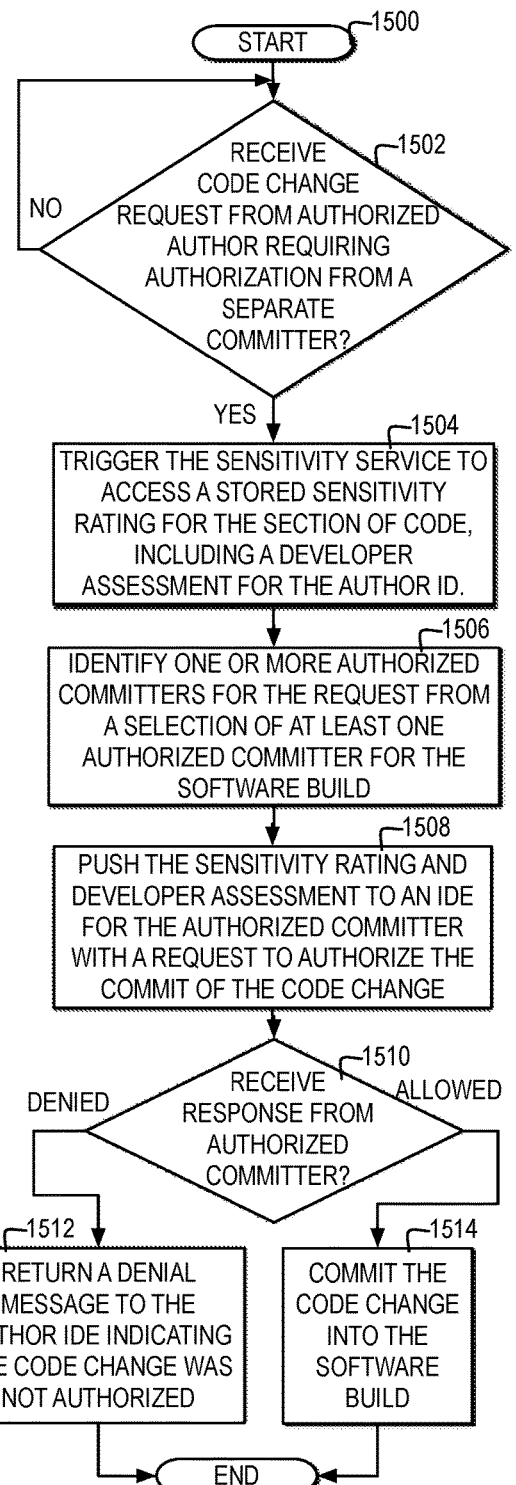
FIG. 15 illustrates one example of a high level logic flowchart of a process and computer program for managing a sensitivity service at an SCS level in response to receiving a code change requiring authorization from one or more authorized committers.

FIG. 15 illustrates a high level logic flowchart of a process and program for managing a sensitivity service at an SCS level in response to receiving a code change requiring authorization from one or more authorized committers.

In one example, the process and program starts at block 1500 and thereafter proceeds to block 1502. Block 1502 illustrates a determination whether a code change request is received from an authorized author, requiring authentication from a separate committer. At block 1502, if a code change request is received from an authorized author, requiring authentication from a separate committer, then the process passes to block 1504. Block 1504 illustrates triggering a sensitivity service to access a stored sensitivity rating for the section of code, including a developer assessment for the author ID. Next, block 1506 illustrates identifying one or more authorized committers for the request from a selection of at least one authorized committer for the software build. Thereafter, block 1508 illustrates pushing the sensitivity rating with developer assessment to an IDE for an authorized committer with a request to authorize the commit of the code change. Next, block 1510 illustrates a determination whether a response is received from the authorized committer.

At block 1510, if a response received from the authorized committer is a denied message, then the process passes to block 1512. Block 1512 illustrates returning a denial message to the author IDE indicating the code change was not authorized, and the process ends.

Returning to block 1510, if a response received from the authorized committer is an allowed message, then the process passes to block 1514. Block 1514 illustrates committing the code change into the software build, and the process ends.

Figures 16, 17:
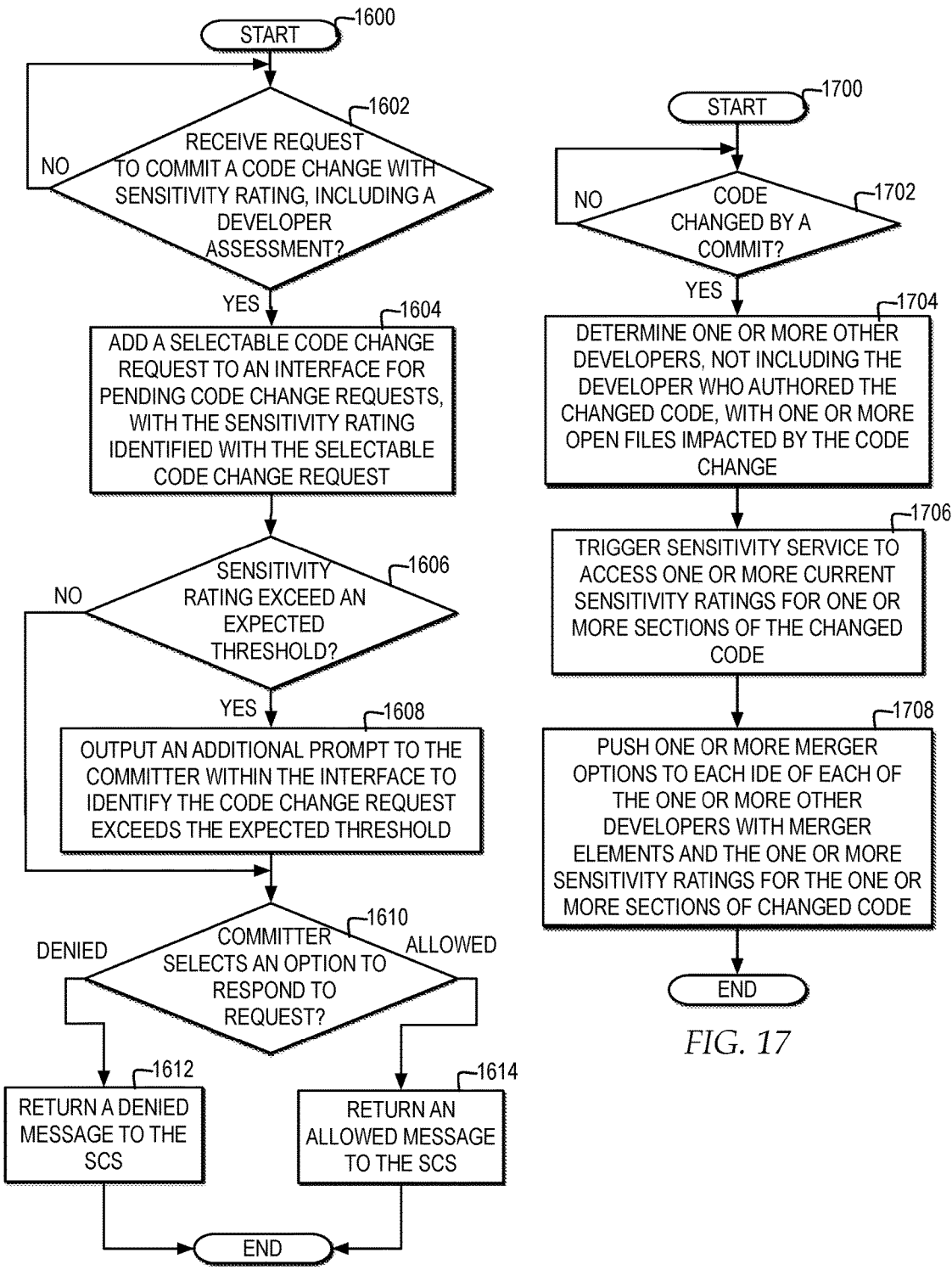
FIG. 16 illustrates one example of a high level logic flowchart of a process and computer program for managing authorization requests to committers that provide the committer with a sensitivity rating, including a developer assessment, with the commit request.
FIG. 17 illustrates one example of a high level logic flowchart of a process and computer program for managing mergers of open files with committed files that provides developers with sensitivity ratings for the committed files.

FIG. 16 illustrates a high level logic flowchart of a process and program for managing authorization requests to committers that provide the committer with a sensitivity rating, including a developer assessment, with the commit request.

In one example, the process and program starts at block 1600 and thereafter proceeds to block 1602. Block 1602 illustrates a determination whether a request to commit a code change, with a sensitivity rating including a developer assessment, is received at a committer IDE. At block 1602, if a request to commit a code change, with a sensitivity rating including a developer assessment, is received at a committer IDE, then the process passes to block 1604. Block 1604 illustrates adding a selectable code change request to an interface for pending code change requests, with the sensitivity rating identified with the selectable code change request. Next, block 1606 illustrates a determination whether the sensitivity rating, including developer assessment, exceeds an expected threshold.

At block 1606, if the sensitivity rating exceeds an expected threshold, then the process passes to block 1608. Block 1608 illustrates outputting an additional prompt to the committer within the interface to identify the code change request exceeds the expected threshold, and the process passes to block 1610.

Returning to block 1606, if the sensitivity rating does not exceed an expected threshold, then the process passes to block 1610. Block 1610 illustrates a determination whether a committer selects an option to respond to the request. At block 1610, if the committer selects an option of "denied", then the process passes to block 1612. Block 1612 illustrates returning a denied message to the SCS, and the process ends. Returning to block 1610, if the committer selects an option of "allowed", then the process passes to block 1614. Block 1614 illustrates returning an allowed message to the SCS, and the process ends FIG. 17 illustrates a high level logic flowchart of a process and program for managing mergers of open files with committed files that provides developers with sensitivity ratings for the committed files.

In one example, the process and program starts at block 1700 and thereafter proceeds to block 1702. Block 1702 illustrates a determination whether code has been changed by a commit to a software build. At block 1702, if code has been changed by a commit to a software build, the process passes to block 1704. Block 1704 illustrates determining one or more other developers, not including the developer who authorized the changed code, with one or more files opened that are impacted by the code change. Next, block 1706 illustrates triggering the sensitivity service to access one or more current sensitivity ratings for the one or more sections of the changed code. Thereafter, block 1708 illustrates pushing the one or more merger options to each IDE of the one or more other developers with merger elements and the one or more sensitivity ratings for the one or more sections of changed code, and the process ends.

Figure 18:
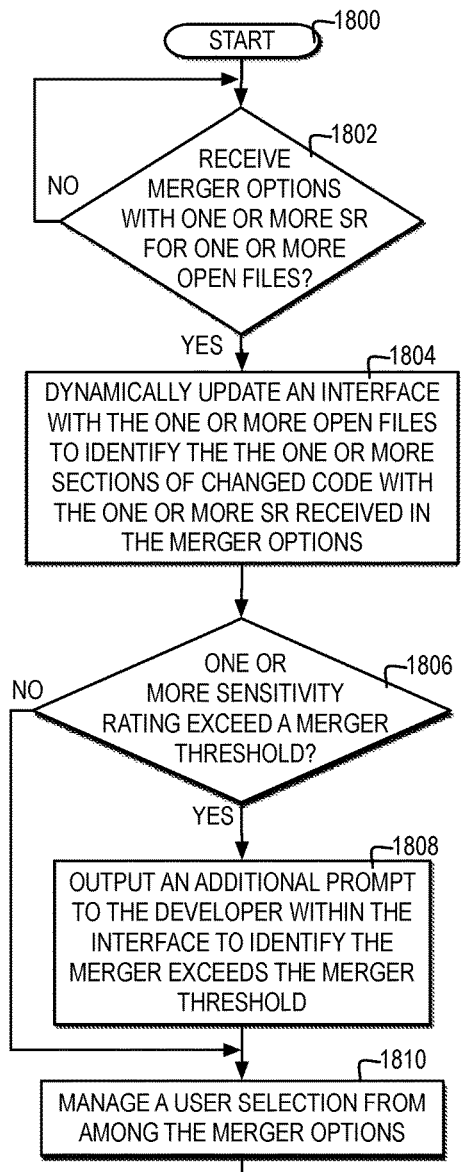
FIG. 18 illustrates one example of a high level logic flowchart of a process and computer program for managing an interface for developers to select whether to merge with changes made in committed files in view of the sensitivity rating of the committed merger elements.

FIG. 18 illustrates a high level logic flowchart of a process and program for managing an interface for developers to select whether to merge with changes made in committed files in view of the sensitivity rating of the committed merger elements.

In one example, the process and program starts at block 1800 and thereafter proceeds to block 1802. Block 1802 illustrates a determination whether an IDE receives merger options with one or more sensitivity ratings for one or more open files within the IDE. At block 1802, if the IDE receives merger options with one or more sensitivity ratings for one or more open files within the IDE, then the process passes to block 1804. Block 1804 illustrates dynamically updating an interface with the one or more open files to identify the one or more sections of changed code and the one or more sensitivity ratings received in the merger options. Next, block 1806 illustrates a determination whether one or more of the sensitivity ratings exceed a merger threshold.

At block 1806, if the one or more of the sensitivity ratings exceeds a merger threshold, then the process passes to block 1808. Block 1808 illustrates outputting an additional prompt to the developer within the interface to identify the merger exceeds the merger threshold, and the process passes to block 1810.

At block 1806, if the one or more of the sensitivity ratings do not exceed a merger threshold, then the process passes to block 1810. Block 1810 illustrates managing a user selection from among the merger options, and the process ends.

Figure 19:
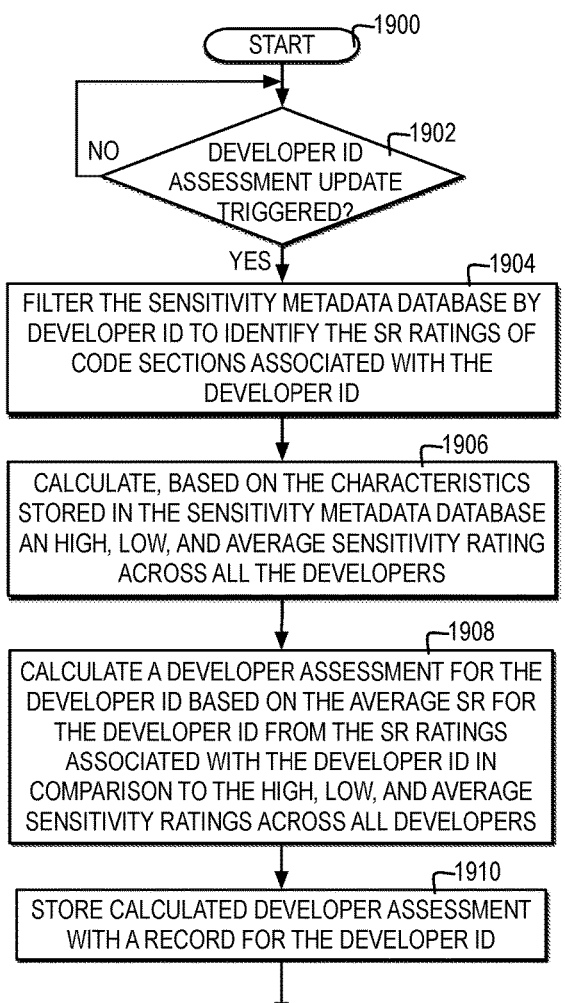
FIG. 19 illustrates one example of a high level logic flowchart of a process and computer program for generating a developer assessment for each developer participating in a software build.

FIG. 19 illustrates a high level logic flowchart of a process and program for generating a developer assessment for each developer participating in a software build.

In one example, the process and program starts at block 1900 and thereafter proceeds to block 1902. Block 1902 illustrates a determination whether a developer ID assessment update is triggered. At block 1902, if a developer ID assessment update is triggered, then the process passes to block 1904. Block 1904 illustrates filtering the sensitivity metadata database by developer ID to identify the SR ratings of code sections associated with the developer ID. Next, block 1906 illustrates calculating, based on the characteristics stored in the sensitivity metadata database, a high, low, and average sensitivity rating across all the developers. Thereafter, block 1908 illustrates calculating a developer assessment for the developer ID based on the average SR for the developer ID from the SR ratings associated with the developer ID in comparison to the high, low, and average SRs across all developers. Next, block 1910 illustrates storing the calculated developer rating with a record for the developer ID, and the process ends.

In one or more embodiments, a method, computer system, and computer program product are directed to, in response to detecting a software build break during testing, identifying a change to a particular file committed to the software build that caused the software build to break during testing, the software build comprising multiple files. The method, computer system, and computer program product are directed to adding a particular record of the change to the particular file to a sensitivity database, the sensitivity database accumulating multiple records of changes to the files during development of the software build. The method, computer system, and computer program product are directed to calculating a relative level of failure of the particular file from among the files of the software build based on the particular record in comparison with the records. The method, computer system, and computer program product are directed to generating a sensitivity rating of the particular file to cause breaks in the software build based on the relative level of failure of the particular file weighted by one or more factors. The method, computer system, and computer program product are directed to outputting the sensitivity rating to one or more integrated development environment interfaces with access to the particular file of the software build. One advantage of generating a sensitivity rating of a particular file of a software build based on the relative level of failure of the particular file within the software build is that the rating reflects an analysis of the sensitivity of that particular file within that particular software build, that provides the developer with more information about the actual sensitivity of a file than are provided by metrics indicating the number of lines of code changed or the number of times a files has been committed. In addition, one advantage of outputting the sensitivity rating to one or more integrated development interfaces with access to the particular file is that one or more developers working on the particular file of the software build receive the sensitivity rating in real-time in the interface used to access and develop the software build.

In one or more embodiments in which a particular record of the change to the particular file is added to a sensitivity database, the sensitivity database accumulates records of changes to the files during development of the software build. The particular record of the change to the particular file is added to a sensitivity database identifying a particular developer identifier of the developer changing the particular file from among developers. A sensitivity rating is generated of the particular file to cause breaks in the software build based on the relative level of failure of the particular file weighted by one or more factors. A developer assessment is calculated indicating a frequency that changes to files submitted by the particular developer caused breaks to the software build based on the records. Generating the sensitivity rating of the particular file to cause breaks in the software file based on the relative level of failure weighted by the one or more factors comprising the developer assessment, has the advantage of accumulating records that indicate the developer identifier associated with each change to a software build, when tracking changes that cause a build to break, such that the frequency at which changes committed by the developer cause build breaks can be calculated. A sensitivity rating for the change to the particular file may reflect the developer assessment for the developer that changed the particular file.

One or more embodiments in which adding a particular record of the change to the particular file to a sensitivity database, the sensitivity database accumulating records of changes to the files during development of the software build includes tracking, through the records, for each separate file from among the plurality of files, a number of lines per commit of each separate file, a number of times each separate file changed before a break, a size of each separate file, an age of each separate file, and a previously calculated sensitivity rating history for each separate file. This embodiment or these embodiments have the advantage of tracking the number of lines per commit of each file, the number of times each file changed before a break, a size of each file, an age of each file and a previously calculated sensitivity rating history for each file. Furthermore, each of these metrics alone may not reflect the full sensitivity of a file to break a build if edited, but when evaluated together for a software build, weighted by one or more factors, may provide developers with a holistic assessment of the sensitivity of a file to cause breaks to a build.

In one or more embodiments the method, computer system, and computer program product also include calculating a relative level of failure of the particular file from among the plurality of files of the software build based on the particular record in comparison with the plurality of records. This embodiment or these embodiments may be further directed to calculating a ratio of a number of commits of the particular file that occur before a build break compared with a number of total commits of the particular file. Such embodiment(s) has the advantage of calculating a ratio of the number of commits of the particular file that occur before a build break compared with a number of total commits of the particular file. Furthermore, the relative failure of a particular file to cause breaks in a build may be determined based on the history of development of the particular file in the particular software build.

In one or more embodiments the method, computer system, and computer program product also include detecting a developer identifier of a particular developer from among a plurality of developers that submitted the change to the particular file to be committed to the software build from a particular integrated development environment interface of the one or more integrated development environment interfaces. The sensitivity rating and an indicator of the software build break during testing are automatically output to the particular integrated development environment interface authenticated for the developer identifier. The sensitivity rating and the indicator of the software build break during testing are output to the particular developer in the integrated development environment interface. A further advantage of outputting the indicator of a software build break during testing to the developer with a sensitivity rating is that the developer receives a dynamically generated indicator, in real-time, of the relative sensitivity of the particular file to cause a break to the software build and the developer may exercise additional caution when editing the file based on the level of the sensitivity rating.

The terminology used herein is for the purpose of describing particular embodiments only and is not intended to be limiting of one or more embodiments of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to one or more embodiments of the invention in the form disclosed. Many modifications and variations will be apparent to those of ordinary skill in the art without departing from the scope and spirit of the one or more embodiments of the one or more embodiments of the invention. The embodiment was chosen and described in order to best explain the principles of the one or more embodiments of the invention and the practical application, and to enable others of ordinary skill in the art to understand the one or more embodiments of the invention for various embodiments with various modifications as are suited to the particular use contemplated.

While the one or more embodiments of the invention has been particularly shown and described with reference to one or more embodiments, it will be understood by those skilled in the art that various changes in form and detail may be made therein without departing from the spirit and scope of the one or more embodiments of the invention.

What is claimed is:

1. A method comprising:
   in response to detecting a software build break during testing, by a computer system, identifying a change to a particular file committed to the software build that caused the software build to break during testing, the software build comprising a plurality of files;
   adding, by the computer system, a particular record of the change to the particular file to a sensitivity database, the sensitivity database accumulating a plurality of records of changes to the plurality of files during development of the software build;
   calculating, by the computer system, a ratio of a number of commits of the particular file that occur before a build break compared with a number of total commits of the particular file;
   calculating, by the computer system, a relative level of failure based on the ratio of the particular file and based on the particular record in comparison with the plurality of records;
   generating, by the computer system, a sensitivity rating of the particular file to cause breaks in the software build based on the relative level of failure of the particular file weighted by one or more factors; and
   outputting, by the computer system, the sensitivity rating to one or more integrated development environment interfaces with access to the particular file of the software build.

2. The method according to claim 1, wherein:
   adding, by the computer system, a particular record of the change to the particular file to a sensitivity database, the sensitivity database accumulating a plurality of records of changes to the plurality of files during development of the software build further comprises:
      adding, by the computer system, a particular record of the change to the particular file to a sensitivity database identifying a particular developer identifier of the developer changing the particular file from among a plurality of developers, wherein the plurality of developers submit changes to the plurality of files during development of the software build;
   generating, by the computer system, a sensitivity rating of the particular file to cause breaks in the software build based on the relative level of failure of the particular file weighted one or more factors further comprises:
      calculating, by the computer system, a developer assessment indicating a frequency that changes to files submitted by the particular developer caused breaks to the software build based on the plurality of records; and
      generating, by the computer system, the sensitivity rating of the particular file to cause breaks in the software file based on the relative level of failure weighted by the one or more factors comprising the developer assessment.

3. The method according to claim 1, wherein adding, by the computer system, a particular record of the change to the particular file to a sensitivity database, the sensitivity database accumulating a plurality of records of changes to the plurality of files during development of the software build further comprises:
   tracking, by the computer system, through the plurality of records, for each separate file from among the plurality of files, a number of lines per commit of each separate file, a number of times each separate file changed before a break, a size of each separate file, an age of each separate file, and a previously calculated sensitivity rating history for each separate file.

4. The method according to claim 1, wherein outputting, by the computer system, the sensitivity rating to one or more integrated development environment interfaces with access to the particular file of the software build, further comprises:
   detecting, by the computer system, a developer identifier of a particular developer from among a plurality of developers that submitted the change to the particular file to be committed to the software build from a particular integrated development environment interface of the one or more integrated development environment interfaces; and
   automatically outputting, by the computer system, the sensitivity rating and an indicator of the software build break during testing to the particular integrated development environment interface authenticated for the developer identifier, wherein the sensitivity rating and the indicator of the software build break during testing are output to the particular developer in the integrated development environment interface.

5. The method according to claim 1, further comprising:
receiving, by the computer system, a request from a particular developer identified as an author, from among a plurality of developers, to commit the change to the particular file to the software build from a particular integrated development environment interface of the one or more integrated development environment interfaces;
accessing, by the computer system, from the sensitivity database, a previously generated sensitivity rating for the particular file and a current developer assessment for the particular developer, the developer assessment comprising a frequency that changes to files submitted by the particular developer caused breaks to the software build based on the plurality of records;
outputting, by the computer system, the request, with the sensitivity rating updated with the developer assessment, to another integrated development environment interface of the one or more integrated development environment interfaces authenticated for another developer identified as a committer, authorized to commit the change to the particular file to the software build, wherein the sensitivity rating updated with the developer assessment is output to the another developer in the another integrated development environment interface;
in response to receiving permission from the another developer in response to the request, committing, by the computer system, the change to the particular file to the software build and triggering testing of the software build;
in response to detecting the software build break during testing, automatically outputting, by the computer system, the sensitivity rating and an indicator of the software build break during testing to the particular integrated development environment interface authenticated for the particular developer identified as the author, wherein the sensitivity rating and the indicator of the software build break during testing are output to the particular developer in the particular integrated development environment interface; and
in response to detecting the software build break during testing, automatically outputting, by the computer system, the sensitivity rating and the indicator of the software build break during testing to the another integrated development environment interface authenticated for the another developer identified as the committer, wherein the sensitivity rating and the indicator of the software build break during testing are output to the another developer in the another integrated development environment interface.

6. The method according to claim 1, further comprising:
storing, by the computer system, the sensitivity rating of the particular file in the sensitivity database in association with an identifier for the particular file from among the plurality of files.

7. The method according to claim 1, further comprising:
in response to committing the change to the particular file to the software build, notifying, by the computer system, a continuous integration system that the change is committed to the particular file and passing the continuous integration system an executable package updated for the software build, wherein the continuous integration system tests the executable package against a plurality of tests, wherein the continuous integration system determines whether the executable package fails one or more of the plurality of tests; and
in response to receiving a testing result from the continuous integration system indicating the executable package fails one or more of the tests, detecting, by the computer system, the software build break during testing.

8. The method according to claim 1, further comprising:
in response to receiving from a source control system a notification that the change is committed to the particular file by a particular developer from among a plurality of developers and an executable package updated for the software build with the change, storing, by the computer system, a record of the notification to the changed code and the developer identifier in the sensitivity database;
testing, by the computer system, the executable package against a plurality of tests, wherein the continuous integration system determines whether the executable package fails one or more of the plurality of tests; and
in response to detecting the executable package fails one or more of the tests, detecting, by the computer system, the software build break during testing.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to, in response to detecting a software build break during testing, identify a change to a particular file committed to the software build that caused the software build to break during testing, the software build comprising a plurality of files;
program instructions to add a particular record of the change to the particular file to a sensitivity database, the sensitivity database accumulating a plurality of records of changes to the plurality of files during development of the software build;
program instructions to calculate a ratio of a number of commits of the particular file that occur before a build break compared with a number of total commits of the particular file;
program instructions to calculate a relative level of failure based on the ratio of the particular file and based on the particular record in comparison with the plurality of records;
program instructions to generate a sensitivity rating of the particular file to cause breaks in the software build based on the relative level of failure of the particular file weighted one or more factors; and
program instructions to output the sensitivity rating to one or more integrated development environment interfaces with access to the particular file of the software build.

10. The computer system according to claim 9, the stored program instructions further comprising:
program instructions to add a particular record of the change to the particular file to a sensitivity database identifying a particular developer identifier of the developer changing the particular file from among a plurality of developers, wherein the plurality of developers submit changes to the plurality of files during development of the software build;
program instructions to calculate a developer assessment indicating a frequency that changes to files submitted by the particular developer caused breaks to the software build based on the plurality of records; and program instructions to generate the sensitivity rating of the particular file to cause breaks in the software file based on the relative level of failure weighted by the one or more factors comprising the developer assessment.

11. The computer system according to claim 9, wherein the stored program instructions to add a particular record of the change to the particular file to a sensitivity database, the sensitivity database accumulating a plurality of records of changes to the plurality of files during development of the software build further comprises:
program instructions to track, through the plurality of records, for each separate file from among the plurality of files, a number of lines per commit of each separate file, a number of times each separate file changed before a break, a size of each separate file, an age of each separate file, and a previously calculated sensitivity rating history for each separate file.

12. The computer system according to claim 9, wherein the stored program instructions to outputting, by the computer system, the sensitivity rating to one or more integrated development environment interfaces with access to the particular file of the software build, further comprise:
program instructions to store a developer identifier of a particular developer from among a plurality of developers that submitted the change to the particular file to be committed to the software build from a particular integrated development environment interface of the one or more integrated development environment interfaces; and
program instructions to output the sensitivity rating and an indicator of the software build break during testing to the particular integrated development environment interface authenticated for the developer identifier, wherein the sensitivity rating and the indicator of the software build break during testing are output to the particular developer in the integrated development environment interface.

13. The computer system according to claim 9, wherein the stored program instructions further comprise:
program instructions to receive a request from a particular developer identified as an author, from among a plurality of developers, to commit the change to the particular file to the software build from a particular integrated development environment interface of the one or more integrated development environment interfaces;
program instructions to access from the sensitivity database, a previously generated sensitivity rating for the particular file and a current developer assessment for the particular developer, the developer assessment comprising a frequency that changes to files submitted by the particular developer caused breaks to the software build based on the plurality of records;
program instructions to output the request, with the sensitivity rating updated with the developer assessment, to another integrated development environment interface of the one or more integrated development environment interfaces authenticated for another developer identified as a committer, authorized to commit the change to the particular file to the software build, wherein the sensitivity rating updated with the developer assessment are output to the another developer in the another integrated development environment interface;
program instructions to, in response to receiving permission from the another developer in response to the request, commit the change to the particular file to the software build and triggering testing of the software build;
program instructions to, in response to detecting the software build break during testing, automatically output the sensitivity rating and an indicator of the software build break during testing to the particular integrated development environment interface authenticated for the particular developer identified as the author, wherein the sensitivity rating and the indicator of the software build break during testing are output to the particular developer in the particular integrated development environment interface; and
program instructions to, in response to detecting the software build break during testing, automatically output the sensitivity rating and the indicator of the software build break during testing to the another integrated development environment interface authenticated for the another developer identified as the committer, wherein the sensitivity rating and the indicator of the software build break during testing are output to the another developer in the another integrated development environment interface.

14. The computer system according to claim 9, the stored program instructions further comprising:
program instructions to store the sensitivity rating of the particular file in the sensitivity database in association with an identifier for the particular file from among the plurality of files.

15. The computer system according to claim 10, the stored program instructions further comprising:
program instructions to, in response to committing the change to the particular file to the software build, notify a continuous integration system that the change is committed to the particular file and passing the continuous integration system an executable package updated for the software build, wherein the continuous integration system tests the executable package against a plurality of tests, wherein the continuous integration system determines whether the executable package fails one or more of the plurality of tests; and
program instructions to, in response to receiving a testing result from the continuous integration system indicating the executable package fails one or more of the tests, detect the software build break during testing.

16. The computer system according to claim 9, the stored program instructions further comprising:
program instructions to, in response to receiving from a source control system a notification that the change is committed to the particular file by a particular developer from among a plurality of developers and an executable package updated for the software build with the change, store a record of the notification to the changed code and the developer identifier in the sensitivity database;
program instructions to test the executable package against a plurality of tests, wherein the continuous integration system determines whether the executable package fails one or more of the plurality of tests; and
program instructions to, in response to detecting the executable package fails one or more of the tests, detect the software build break during testing.

17. The computer program product according to claim 16, further comprising the program instructions executable by a computer to cause the computer to:
add, by the computer, a particular record of the change to the particular file to a sensitivity database identifying a particular developer identifier of the developer changing the particular file from among a plurality of developers, wherein the plurality of developers submit changes to the plurality of files during development of the software build;

calculate, by the computer, a developer assessment indicating a frequency that changes to files submitted by the particular developer caused breaks to the software build based on the plurality of records; and generate, by the computer, the sensitivity rating of the particular file to cause breaks in the software file based on the relative level of failure weighted by the one or more factors comprising the developer assessment.

18. The computer program product according to claim 16, further comprising the program instructions executable by a computer to cause the computer to:

track, by the computer, through the plurality of records, for each separate file from among the plurality of files, a number of lines per commit of each separate file, a number of times each separate file changed before a break, a size of each separate file, an age of each separate file, and a previously calculated sensitivity rating history for each separate file.

19. A computer program product, the computer program product comprising a computer readable storage medium having program instructions embodied therewith, wherein the computer readable storage medium is not a transitory signal per se, the program instructions executable by a computer to cause the computer to:

in response to detecting a software build break during testing, by a computer, identify a change to a particular file committed to the software build that caused the software build to break during testing, the software build comprising a plurality of files;

add, by the computer, a particular record of the change to the particular file to a sensitivity database, the sensitivity database accumulating a plurality of records of changes to the plurality of files during development of the software build;

calculate, by the computer, a ratio of a number of commits of the particular file that occur before a build break compared with a number of total commits of the particular file;

calculate, by the computer, a relative level of failure based on the ratio of the particular file and based on the particular record in comparison with the plurality of records;

generate, by the computer, a sensitivity rating of the particular file to cause breaks in the software build based on the relative level of failure of the particular file weighted one or more factors; and output, by the computer, the sensitivity rating to one or more integrated development environment interfaces with access to the particular file of the software build.

* * * * *